(12) United States Patent
Yajima et al.

(10) Patent No.: US 9,626,899 B2
(45) Date of Patent: Apr. 18, 2017

(54) ELECTRO-OPTICAL APPARATUS AND ELECTRONIC APPARATUS

(71) Applicant: SEIKO EPSON CORPORATION, Tokyo (JP)

(72) Inventors: Hideaki Yajima, Chino (JP); Shin Fujita, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 14 days.

(21) Appl. No.: 14/567,403

(22) Filed: Dec. 11, 2014

(65) Prior Publication Data

US 2015/0177522 A1 Jun. 25, 2015

(30) Foreign Application Priority Data

Dec. 24, 2013 (JP) .................................. 2013-265004
Sep. 1, 2014 (JP) .................................. 2014-176880
Oct. 15, 2014 (JP) .................................. 2014-210518
Oct. 15, 2014 (JP) .................................. 2014-210524

(51) Int. Cl.
*G02B 27/01* (2006.01)
*G09G 3/3208* (2016.01)
*G09G 3/00* (2006.01)
*G09G 3/3233* (2016.01)

(52) U.S. Cl.
CPC ......... *G09G 3/3208* (2013.01); *G02B 27/017* (2013.01); *G09G 3/003* (2013.01); *G09G 3/3233* (2013.01); *G02B 2027/0178* (2013.01)

(58) Field of Classification Search
CPC .... G09G 3/3208; G09G 3/003; G09G 3/3233; G02B 27/017; G02B 2027/0178
See application file for complete search history.

(56) References Cited

U.S. PATENT DOCUMENTS

| | | | |
|---|---|---|---|
| 6,157,533 A | 12/2000 | Sallam et al. | |
| 6,262,889 B1 | 7/2001 | Newman et al. | |
| 2002/0186177 A1 | 12/2002 | Hong et al. | |
| 2007/0035241 A1* | 2/2007 | Abe | H01J 1/74 313/506 |
| 2010/0053031 A1* | 3/2010 | Koike | G02B 27/017 345/8 |
| 2010/0079356 A1* | 4/2010 | Hoellwarth | G02B 27/017 345/8 |
| 2011/0090426 A1* | 4/2011 | Choi | G02B 6/009 349/65 |
| 2012/0206817 A1* | 8/2012 | Totani | G02B 27/0172 359/633 |
| 2013/0222919 A1 | 8/2013 | Komatsu et al. | |

FOREIGN PATENT DOCUMENTS

| | | |
|---|---|---|
| JP | A-2000-305652 | 11/2000 |
| JP | A-2001-306187 | 11/2001 |
| JP | A-2003-15774 | 1/2003 |

(Continued)

*Primary Examiner* — Premal Patel
(74) *Attorney, Agent, or Firm* — Oliff PLC

(57) ABSTRACT

There is provided an electro-optical apparatus which is wearable on a human body, including: a display unit that includes pixels and a drive circuit which drives the pixel; and an case that contains the display unit and includes a contact surface which comes into contact with the human body. The contact surface is arranged to have at least one space from the display unit.

20 Claims, 18 Drawing Sheets

(56) References Cited

FOREIGN PATENT DOCUMENTS

| | | | |
|---|---|---|---|
| JP | A-2012-11125 | | 1/2012 |
| JP | 2012156618 A | * | 8/2012 |
| JP | A-2012-156618 | | 8/2012 |
| JP | A-2013-200554 | | 10/2013 |

* cited by examiner

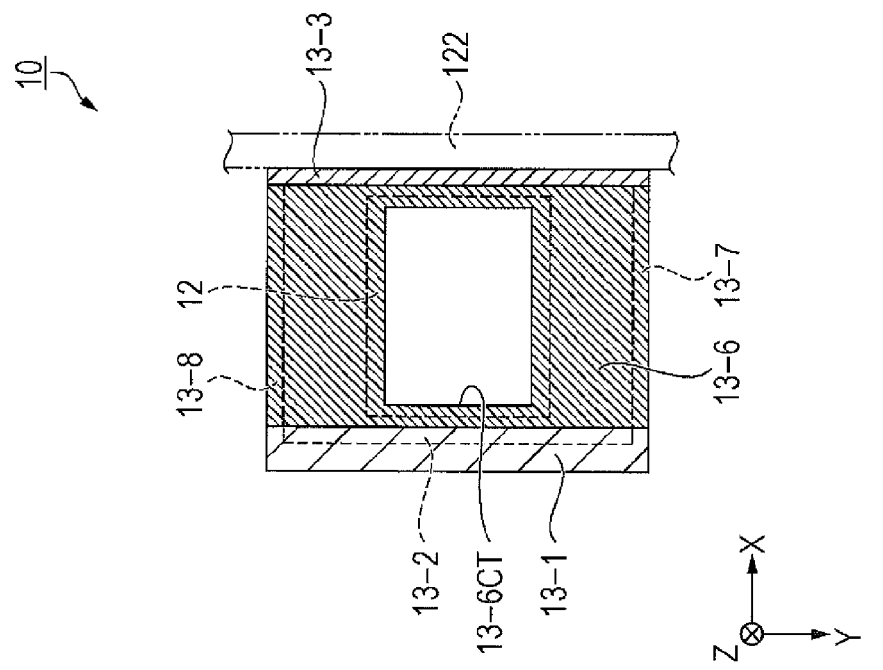
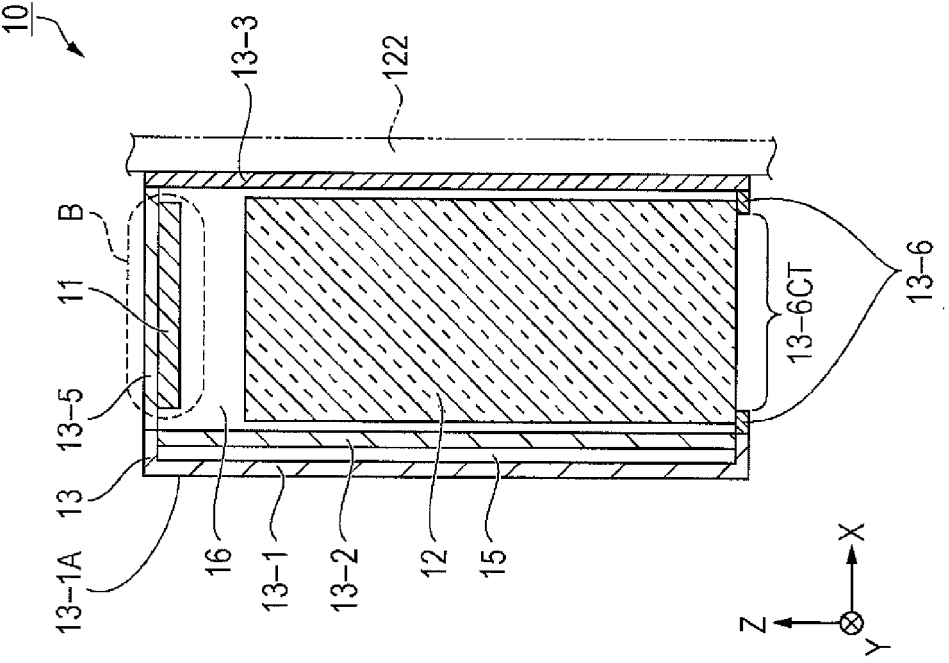

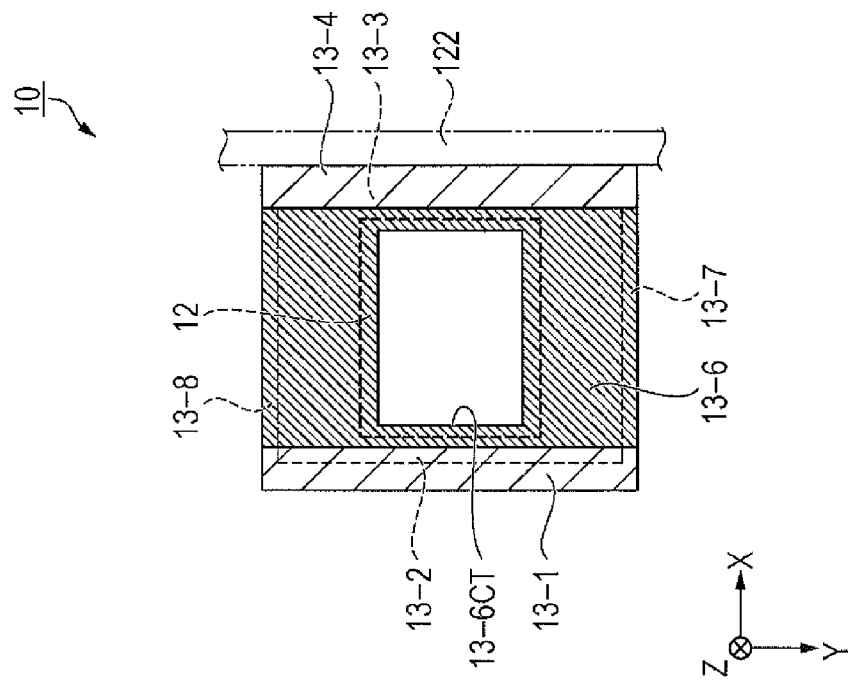
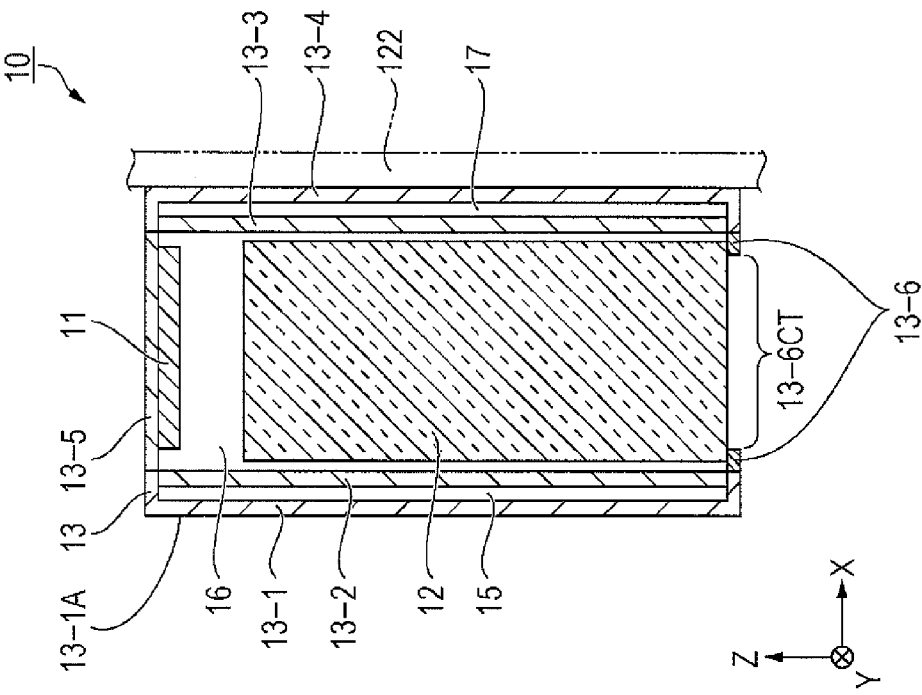

ELECTRO-OPTICAL APPARATUS AND ELECTRONIC APPARATUS

BACKGROUND

1. Technical Field

The present invention relates to an electro-optical apparatus and an electronic apparatus on which the electro-optical apparatus is mounted.

2. Related Art

A Head-Mounted Display (HMD) device, which is worn on the head of a human body and is configured to observe an image, provides excellent convenience, in which the HMD is small and lightweight and can be carried easily, and is capable of providing stereoscopic display using, for example, images which respectively correspond to right and left eyes. For example, JP-A-2013-200554 discloses an HMD which has a see-through function to superimposedly display image light while not disturbing an external world image (external world figure).

The HMD disclosed in JP-A-2013-200554 includes an image display device and a projecting/fluoroscopic device, and the image display device is arranged to come into contact with the temples of a wearer.

The image display device includes a self-luminous organic electroluminescence (hereinafter, referred to as an organic EL) display device. The organic EL display device includes organic EL elements which function as light emitting elements, a drive circuit which drives the organic EL elements, and the like. Each of the organic EL elements includes an anode, a cathode, a light emitting function layer interposed therebetween, and the like. When a current flows between the anode and the cathode, the light emitting function layer emits light.

According to the configuration, the image display device outputs image light which is a display target, such as video, to the side of the projecting/fluoroscopic device.

The projecting/fluoroscopic device includes a light guiding member, a prism, and the like, and induces the image light, which is emitted from the image display device, and external world image light to the side of the wearer.

However, the organic EL elements generate heat due to the current which flows between the anode and the cathode. Since the drive circuit controls the whole current which flows through the plurality of organic EL elements, a large amount of current flows compared to a single organic EL element, and thus heat is significantly generated. That is, the HMD disclosed in JP-A-2013-200554 has a problem in that the organic EL elements or the drive circuit generate heat when the image light which is the display target such as video is output, and thus the temperature of the image display device rises. In addition, there is a problem in that a fit feeling (comfort) in the use of the HMD may be impaired due to the temperature rise.

SUMMARY

The invention can be realized in the following forms or application examples.

APPLICATION EXAMPLE 1

According to this application example, there is provided an electro-optical apparatus which is wearable on a human body, the apparatus including: a display unit that includes pixels and a drive circuit which drives the pixels; and an case that contains the display unit and includes a contact surface which comes into contact with the human body. The contact surface is arranged to have at least one space from the display unit.

The electro-optical apparatus according to the application example, includes the display unit which outputs image light, the case which contains the display unit, and the like. If the image light is output by causing a current to flow through the pixels and the drive circuit, the pixels and the drive circuit generate heat due to the current, and thus the temperature of the display unit rises. The contact surface which comes into contact with the human body is arranged to have at least one space from the display unit. The space is an area filled with air, and is an excellent thermal insulation area which does not transfer (propagate) heat easily compared to solids or liquids. That is, the excellent thermal insulation area (space) is arranged between the contact surface and the display unit.

Therefore, heat, which is generated by the pixels and the drive circuit of the display unit, is not transferred (propagated) easily to the side of the contact surface, and thus the temperature of the contact surface does not rise easily. Therefore, when the electro-optical apparatus is used after being worn on the head, it is possible to suppress discomfort due to the temperature rise, and thus it is possible to secure comfort without impairing a fit feeling.

APPLICATION EXAMPLE 2

In the electro-optical apparatus according to the application example, it is preferable that the space be filled with atmospheric pressure air or depressurized air.

When the space arranged between the contact surface and the display unit is filled with atmospheric pressure air or depressurized air, it is possible to reduce the weight of the space and to increase the thermal insulation of the space compared to, for example, a case in which the space is filled with liquids or solids.

APPLICATION EXAMPLE 3

In the electro-optical apparatus according to the application example, it is preferable that the contact surface be arranged to have two spaces from the display unit.

When two spaces (excellent thermal insulation areas) are arranged between the contact surface and the display unit, it is possible to further increase thermal insulation compared to, for example, a case in which a single space is arranged.

Meanwhile, it is possible to further arrange more spaces between the contact surface and the display unit. However, if more spaces are arranged between the contact surface and the display unit, a size between the contact surface, which comes into contact with the human body, and the display unit increases, and thus it is difficult to cause the display unit (electro-optical apparatus) to be thin.

That is, in order to cause the display unit to be thin and to increase the thermal insulation of the display unit, it is preferable that two spaces be arranged between the contact surface and the display unit.

APPLICATION EXAMPLE 4

According to this application example, there is provided an electro-optical apparatus which is wearable on a human body, the apparatus including a display unit that includes pixels and a drive circuit which drives the pixels; and an case that contains the display unit and includes a contact surface which comes into contact with the human body. The case includes a first wall, a second wall, and a third wall that are sequentially arranged in a first direction which faces the display unit from the contact surface which comes into contact with the human body, the first wall includes the contact surface which comes into contact with the human body, and the display unit is arranged between the second wall and the third wall.

The first wall, the second wall, and the third wall are sequentially arranged in the first direction which faces the display unit from the contact surface which comes into contact with the human body, and the first wall includes the contact surface which comes into contact with the human body. Further, the display unit is arranged between the second wall and the third wall. Accordingly, a first space, which is formed between the first wall and the second wall, is arranged between the contact surface and the display unit. Further, when the display unit is arranged to be separated from the second wall, a second space is arranged (formed) between the display unit and the second wall. Accordingly, the electro-optical apparatus according to the application example includes at least one space, that is, at least one excellent thermal insulation area between the contact surface and the display unit.

Therefore, heat generated by the pixels and the drive circuit of the display unit is not transferred (propagated) easily to the contact surface, and the temperature of the contact surface does not rise easily.

APPLICATION EXAMPLE 5

In the electro-optical apparatus according to the application example, it is preferable that a space between the first wall and the second wall and a space between the second wall and the third wall be filled with atmospheric pressure air or depressurized air.

When the space between the first wall and the second wall is filled with atmospheric pressure air or depressurized air, it is possible to reduce the weight of the space and to increase the thermal insulation of the space compared to, for example, a case in which the space is filled with liquids or solids. In the same manner, when the space between the second wall and the third wall is filled with atmospheric pressure air or depressurized air, it is possible to reduce the weight of the space and to increase the thermal insulation of the space compared to, for example, a case in which the space is filled with liquids or solids.

APPLICATION EXAMPLE 6

In the electro-optical apparatus according to the application example, it is preferable that the case include the first wall, the second wall, the third wall, and a fourth wall that are sequentially arranged in the first direction, and a space between the third wall and the fourth wall be filled with atmospheric pressure air or depressurized air.

For example, the first wall and the fourth wall are arranged on the side of the surface of the case, and the second wall and the third wall are arranged inside the case. For example, if the temperature of the fourth wall rises when a user holds the first wall and the fourth wall and detaches the electro-optical apparatus, there is a problem in that the user feels uncomfortable when the user holds the fourth wall.

The space between the third wall and the fourth wall is formed between the display unit and the fourth wall, and the space is filled with air. That is, the excellent thermal insulation area is arranged between the display unit and the fourth wall. Accordingly, heat generated by the pixels and the drive circuit of the display unit is not transferred (propagated) easily to the side of the fourth wall, and thus the temperature of the fourth wall does not rise easily. Therefore, it is possible to suppress the uncomfortable feeling when the temperature of the fourth wall rises.

APPLICATION EXAMPLE 7

In the electro-optical apparatus according to the application example, it is preferable that the case include a fifth wall, and the display unit be fixed to the fifth wall.

The display unit is fixed to the fifth wall which is different from the first wall having the contact surface. Accordingly, heat generated by the pixels and the drive circuit of the display unit is transferred (propagated) to the side of the fifth wall, and heat is radiated while using the fifth wall as a heat radiation section.

APPLICATION EXAMPLE 8

In the electro-optical apparatus according to the application example, it is preferable that at least one of a thermal conductivity of the first wall and a thermal conductivity of the second wall be less than a thermal conductivity of the fifth wall.

At least one of the first wall and the second wall is formed of a material which does not conduct heat easily compared to the fifth wall. When a wall which is formed of the material which does not conduct heat easily is arranged between the user and the display unit, it is possible to suppress the influence of heat generated by the pixels and the drive circuit.

The fifth wall is formed of the material which conducts heat easily compared to at least one of the first wall and the second wall. Accordingly, heat generated by the pixels and the drive circuit of the display unit is rapidly and efficiently transferred (propagated) to the side of the fifth wall, and thus it is possible to rapidly and efficiently radiate heat using the fifth wall.

APPLICATION EXAMPLE 9

In the electro-optical apparatus according to the application example, it is preferable that organic electroluminescence elements be formed in the pixels.

Since the organic electroluminescence element is a self-luminous display element, backlight, which functions as a light source, is not necessary, thereby being excellent in small size (compact) and lightweight compared to a non-light emitting-type display element such as a liquid crystal element. Accordingly, when the organic electroluminescence elements are formed in the display unit, it is possible to cause the display unit to be thin and lightweight compared to a case in which liquid crystal elements are formed in the display unit.

APPLICATION EXAMPLE 10

According to this application example, there is provided an electro-optical apparatus which is wearable on a human body, the apparatus including: a display unit that includes pixels and a drive circuit which drives the pixels; a panel case that contains the display unit; and an case that contains the panel case. The exterior case includes a first wall and a second wall, the first wall includes a contact surface which comes into contact with the human body, the panel case is arranged between the first wall and the second wall, and a distance between the first wall and the panel case is greater than a distance between the second wall and the panel case.

For example, the first wall and the second wall are sequentially arranged in a direction which faces from the contact surface, which comes into contact with the human body, to the panel case, and the first wall includes the contact surface which comes into contact with the human body. Further, the panel case is arranged between the first wall and the second wall. Accordingly, a space which is formed between the first wall and the panel case is arranged between the contact surface and the panel case. Further, when the panel case is arranged to be separated from the second wall, a space is arranged between the panel case and the second wall.

The distance between the first wall and the panel case is greater than the distance between the second wall and the panel case. That is, a space is arranged between the first wall (contact surface) and the panel case, which is greater than the space between the second wall and the panel case, and thus the thermal insulation of the space between the first wall and the panel case is improved compared to the space between the second wall and the panel case. Accordingly, compared to a case in which a space is arranged between the first wall (contact surface) and the panel case, which has the same size as the space between the second wall and the panel case, or a case in which a space is less than the space between the second wall and the panel case is arranged, heat of the panel case is not transferred (propagated) easily to the first wall (contact surface), and thus the temperature of the contact surface does not rise easily. Therefore, when the electro-optical apparatus is used after being worn on the head, it is possible to suppress discomfort due to the temperature rise, and thus it is possible to secure comfort without impairing a fit feeling.

APPLICATION EXAMPLE 11

In the electro-optical apparatus according to the application example, it is preferable that a space between the first wall and the panel case and a space between the second wall and the panel case be filled with atmospheric pressure air or depressurized air.

When the space between the first wall and the panel case is filled with atmospheric pressure air or depressurized air, it is possible to reduce the weight of the space and to increase the thermal insulation of the space compared to, for example, a case in which the space is filled with liquids or solids. In the same manner, when the space between the second wall and the panel case is filled with atmospheric pressure air or depressurized air, it is possible to reduce the weight of the space and to increase the thermal insulation of the space compared to, for example, the case in which the space is filled with liquids or solids.

APPLICATION EXAMPLE 12

In the electro-optical apparatus according to the application example, it is preferable that the distance between the first wall and the panel case be equal to or less than 12 mm and the distance between the second wall and the panel case be equal to or greater than 0 mm.

When the distance between the first wall and the panel case is equal to or less than 12 mm, convection does not easily occur in the space between the first wall and the panel case, and thus it is possible to suppress the transfer (propagation) of heat due to the convection of air (circulation of air). That is, the heat of the panel case is not transferred (propagated) easily to the first wall due to the convection of air.

When the distance between the second wall and the panel case is greater than 0 mm and a space is provided between the second wall and the panel case, the heat of the panel case is not transferred (propagated) easily to the second wall. Further, even when the distance between the second wall and the panel case is 0 mm and the second wall comes into contact with the panel case, the second wall does not include the contact surface, and thus the influence of the heat of the panel case with regard to the contact surface is not large. In addition, when the distance between the second wall and the panel case is 0 mm, the distance between the first wall and the second wall is reduced, and thus it is possible to cause the case to be thin.

APPLICATION EXAMPLE 13

According to this application example, there is provided an electro-optical apparatus which is wearable on a human body, the apparatus including: a display unit that includes pixels and a drive circuit which drives the pixels; a panel case that contains the display unit; and an case that contains the panel case. The case includes a first wall, a third wall, and a second wall, the first wall includes a contact surface which comes into contact with the human body, the panel case is arranged between the second wall and the third wall, and a sum of a distance between the first wall and the third wall and a distance between the third wall and the panel case is greater than a distance between the second wall and the panel case.

For example, the first wall, the third wall, and the second wall are sequentially arranged in the direction which faces the panel case from the contact surface which comes into contact with the human body, and the first wall includes the contact surface which comes into contact with the human body. Further, the panel case is arranged between the second wall and the third wall. Accordingly, a space formed between the first wall and the third wall and a space formed between the third wall and the panel case are arranged between the contact surface and the panel case. Further, when the panel case is arranged to be separated from the second wall, a space is arranged between the panel case and the second wall.

The sum of the distance between the first wall and the third wall and the distance between the third wall and the panel case is greater than the distance between the second wall and the panel case. That is, compared to the space between the second wall and the panel case, the thermal insulation of the space between the first wall and the panel case is improved. Accordingly, compared to a case in which a space, which has the same size as the space between the second wall and the panel case, is arranged between the first wall (contact surface) and the panel case or a case in which a space which is smaller than the space between the second wall and the panel case is arranged, the heat of the panel case is not transferred (propagated) easily to the first wall (contact surface), and thus the temperature of the contact surface does not rise easily.

APPLICATION EXAMPLE 14

In the electro-optical apparatus according to the application example, it is preferable that a space between the first wall and the third wall, a space between the third wall and the panel case, and a space between the second wall and the panel case be filled with atmospheric pressure air or depressurized air.

When the space between the first wall and the third wall is filled with atmospheric pressure air or depressurized air, it is possible to reduce the weight of the space and to increase the thermal insulation of the space, compared to, for example, a case in which the space is filled with liquids or solids. In the same manner, when the space between the third wall and the panel case is filled with atmospheric pressure air or depressurized air, it is possible to reduce the weight of the space and to increase the thermal insulation of the space, compared to, for example, a case in which the space is filled with liquids or solids. In the same manner, when the space between the second wall and the panel case is filled with atmospheric pressure air or depressurized air, it is possible to reduce the weight of the space and to increase the thermal insulation of the space, compared to, for example, a case in which the space is filled with liquids or solids.

APPLICATION EXAMPLE 15

According to this application example, there is provided an electro-optical apparatus which is wearable on a human body, the apparatus including: a display unit that includes pixels and a drive circuit which drives the pixel; a panel case that contains the display unit; and an case that contains the panel case and includes a contract surface which comes into contact with the human body. The contact surface is arranged to have at least one space from the panel case.

The electro-optical apparatus according to the application example includes the display unit which outputs the image light, the panel case that contains the display unit, and the case that contains the panel case. When image light is output by causing a current to flow through the pixels and the drive circuit, the pixels and the drive circuit generate heat due to the current, and thus the temperature of the display unit rises. Further, heat which is generated by the pixels and the drive circuit is transferred (propagated) to the panel case, and thus the temperature of the panel case rises. The contact surface which comes into contact with the human body is arranged to have at least one space from the panel case. The space is an area which is filled with gas, and is an excellent thermal insulation area which does not transfer (propagate) heat easily compared to solids or liquids. That is, the excellent thermal insulation area (space) is arranged between the contact surface and the panel case.

Therefore, the heat generated by the pixels and the drive circuit of the display unit is not transferred (propagated) easily to the side of the contact surface, and the temperature of the contact surface does not rise easily.

APPLICATION EXAMPLE 16

In the electro-optical apparatus according to the application example, it is preferable that the space be filled with atmospheric pressure air or depressurized air.

When the space, which is arranged between the contact surface and the panel case, is filled with atmospheric pressure air or depressurized air, it is possible to reduce the weight of the space and to increase the thermal insulation of the space compared to, for example, a case in which the space is filled with liquids or solids.

APPLICATION EXAMPLE 17

In the electro-optical apparatus according to the application example, it is preferable that a thermal conductivity of the case be less than a thermal conductivity of the panel case.

The thermal conductivity of the case is less than the thermal conductivity of the panel case, and thus heat is not conducted easily. Accordingly, heat generated by the pixels and the drive circuit is not transferred (propagated) easily to the case (contact surface), and thus the temperature of the contact surface does not rise easily.

The thermal conductivity of the panel case is greater than the thermal conductivity of the case, and thus heat is easily conducted. Accordingly, it is possible to efficiently transfer (propagate) the heat generated by the pixels and the drive circuit of the display unit to a heat radiation section through the panel case.

APPLICATION EXAMPLE 18

According to this application example, there is provided an electronic apparatus including the electro-optical apparatus according to the application example.

In the electro-optical apparatus according to the application example, the temperature rise of the contact surface is suppressed. Therefore, when the electro-optical apparatus is applied to the electronic apparatus according to the application example, the temperature rise of the contact surface is suppressed, and thus it is possible to suppress, for example, discomfort due to the temperature rise. For example, when the electro-optical apparatus is applied to the display unit of the electronic apparatus, such as a head-mounted display device, a wearable computer, a wearable phone, or a wearable watch, which is wearable on the human body, it is possible to provide an excellent electronic apparatus.

APPLICATION EXAMPLE 19

According to this application example, there is provided an electro-optical apparatus which is wearable on a human body, including: a display unit that includes pixels and a drive circuit which drives the pixels; and an case that contains the display unit and includes a wall which is positioned on a side of the human body. The wall is arranged to have at least one space from the display unit.

APPLICATION EXAMPLE 20

According to this application example, there is provided an electro-optical apparatus which is wearable on a human body, including: a display unit that includes pixels and a drive circuit which drives the pixels; a panel case that contains the display unit; and an case that contains the panel case. The case includes a first wall and a second wall, the first wall is positioned on a side of the human body, the panel case is arranged between the first wall and the second wall, and a distance between the first wall and the panel case is greater than a distance between the second wall and the panel case.

BRIEF DESCRIPTION OF THE DRAWINGS

The invention will be described with reference to the accompanying drawings, wherein like numbers reference like elements.

FIG. 3A is a schematic cross-sectional diagram illustrating the configuration of a first image forming device, and FIG. 3B is a schematic plan diagram illustrating the first image forming device.

FIG. 7A is a schematic diagram illustrating the configuration of an image forming device according to a second embodiment, and FIG. 7B is a schematic plan diagram illustrating the image forming device.

DESCRIPTION OF EXEMPLARY EMBODIMENTS

Figure 1:
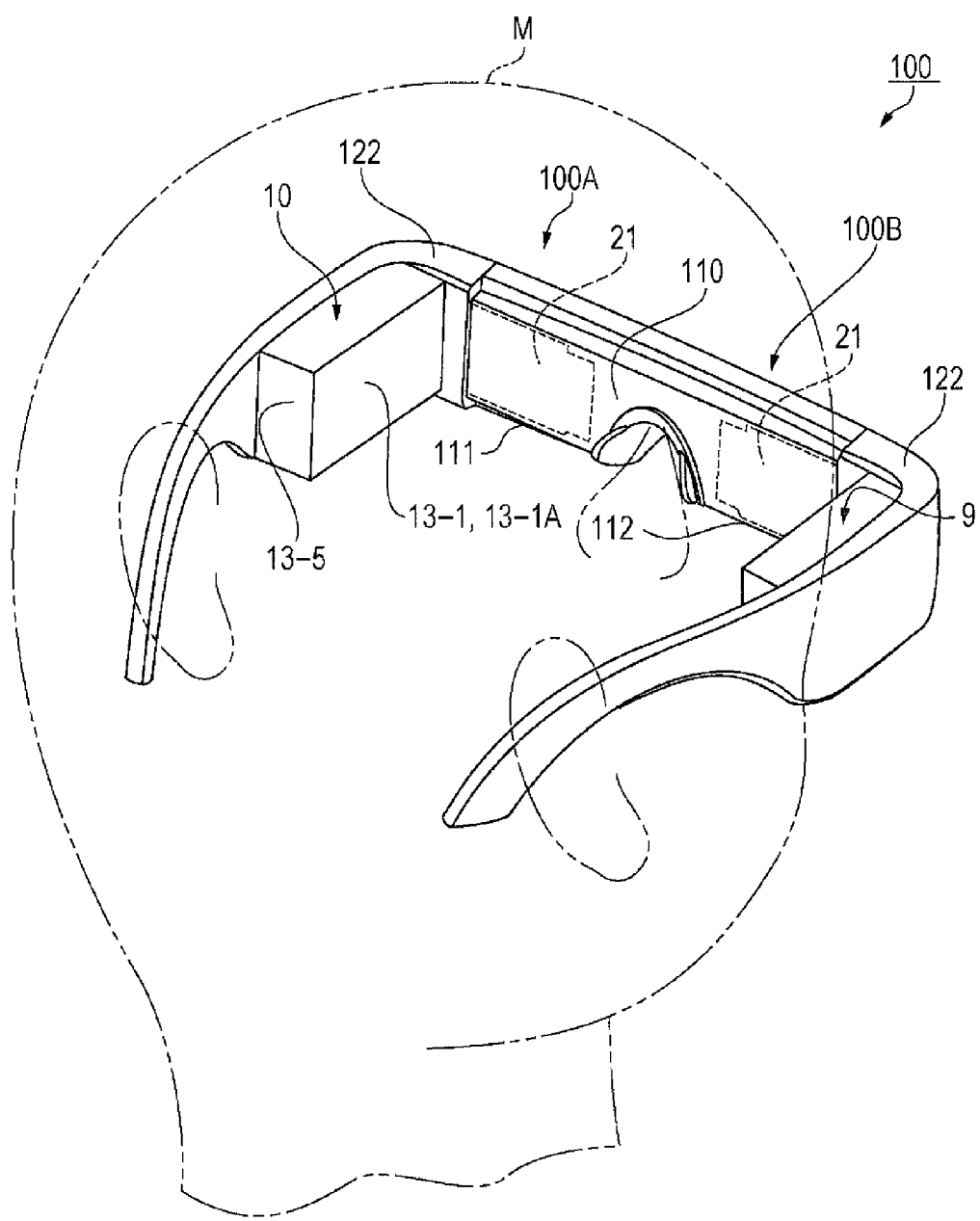
FIG. 1 is a schematic diagram illustrating the configuration of a virtual image display device according to a first embodiment.

Hereinafter, embodiments of the invention will be described with reference to the accompanying drawings. The embodiments are examples of the present application, do not limit the present application, and can be arbitrarily modified within the technical scope of the present application. In addition, in each of the drawings, each layer and each part are shown in a size which can be recognized on the drawing, and thus the scales of each layer and each part are different from actual scales.

First Embodiment

Overview of Virtual Image Display Device

A virtual image display device 100 according to a first embodiment is a Head-Mounted Display (HMD) Device which is an example of an "electronic apparatus", has an appearance like glasses, and is mounted on the head of a human body. A wearer M, on which the virtual image display device 100 is mounted, can recognize image light based on a virtual image using the virtual image display device 100. Further, the virtual image display device 100 has a see-through function. Accordingly, the wearer M can simultaneously observe the virtual image, generated by the virtual image display device 100, and external world image.

FIG. 1 is a schematic diagram illustrating the configuration of the virtual image display device according to the embodiment. First, the overview of the virtual image display device 100 will be described with reference to FIG. 1.

As shown in FIG. 1, the virtual image display device 100 includes an optical panel 110 which covers the front of the eyes of the wearer M, a housing 122 which supports the optical panel 110 or the like, and a first image forming device 10 and a second image forming device 9 which are added from a part of the front cover of the housing 122 to a part of the side temples.

Meanwhile, the first image forming device 10 and the second image forming device 9 are examples of an "electro-optical apparatus".

The optical panel 110 includes a first panel part 111 and a second panel part 112, and both the panel parts 111 and 112 are plate components which are integrally connected at the center. A first display device 100A, which is formed by combining the first panel part 111 and the first image forming device 10 on the left side of the drawing, is a part which forms a left eye virtual image, and functions as the virtual image display device individually. In addition, a second display device 100B, which is formed by combining the second panel part 112 and the second image forming device 9 on the right side of the drawing, is a part which forms a right eye virtual image, and functions as the virtual image display device individually.

The housing 122 is the housing of the virtual image display device 100. The housing 122 includes parts which come into contact with a human body, such as parts which come into contact with the ears of the wearer M, a part which comes into contact with the forehead of the wearer M, and a part which comes into contact with the nose of the wearer M.

The first image forming device 10 is mounted on the housing 122, is integrated to the housing 122, and is used to be attachable to or detachable from the head of a human body. The first image forming device 10 includes a wall 13-1 on the side of the temples of the wearer M, and a surface of the wall 13-1 on the side of the wearer M is a surface 13-1A which comes into contact with the human body (hereinafter, referred to as a "contact surface"). Further, the first image forming device 10 includes a wall 13-5 which is arranged to cross the wall 13-1, and an image display device 11 (refer to FIG. 2), which will be described later, is fixed to the wall 13-5. In addition, the wall 13-1 and the wall 13-5 are parts of an exterior case 13 (refer to FIG. 2) which will be described later.

Meanwhile, the wall 13-1 is an example of a "first wall". The wall 13-5 is an example of a "fifth wall".

In addition, the second display device 100B has the same structure (configuration) as the first display device 100A, the second image forming device 9 has the same structure (configuration) as the first image forming device 10, and the right and left thereof are only reversed, respectively. Therefore, the description of the second display device 100B and the second image forming device 9 will not be repeated, and the feature of the embodiment will be described according to the first display device 100A and the first image forming device 10.

In descriptions hereinafter, the first image forming device 10 is called an image forming device 10.

Overview of Display Device

Figure 2:
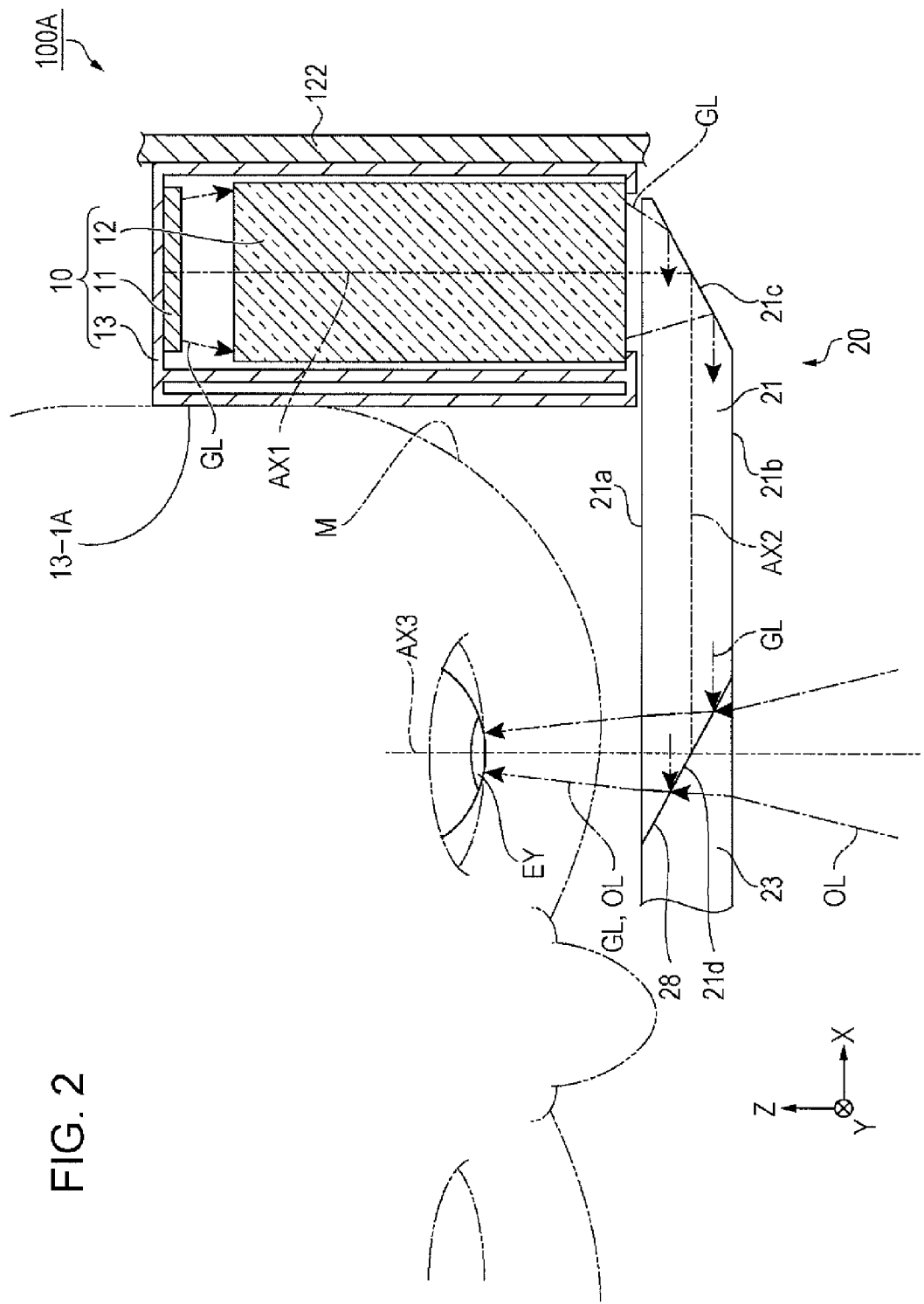
FIG. 2 is a schematic cross-sectional diagram illustrating the configuration of a first display device.

FIG. 2 is a schematic cross-sectional diagram illustrating the configuration of the first display device. In the drawing, image light GL and outside light OL emitted from the image display device 11 are expressed by dashed-line arrows.

Subsequently, the overview of the first display device 100A will be described with reference to FIG. 2.

As shown in FIG. 2, the first display device 100A includes the image forming device 10 and a light guiding device 20.

The optical system of the first display device 100A includes a first optical axis AX1, a second optical axis AX2, and a third optical axis AX3. In FIG. 2, the first optical axis AX1 is parallel to the third optical axis AX3, and the second optical axis AX2 is perpendicular to the first optical axis AX1 and the third optical axis AX3.

The first optical axis AX1 may not be parallel to the third optical axis AX3, and the second optical axis AX2 may not be perpendicular to the first optical axis AX1 and the third optical axis AX3. When the wearer wears the virtual image display device 100, the optical axes may be arranged such that light from the image display device 11 reaches the eye EY of the wearer.

The image forming device 10 includes the image display device 11, an optical projection system 12, and an exterior case 13. The image display device 11 outputs (emits) image light GL toward the side of the optical projection system 12. The optical projection system 12 is a collimate lens which converts the image light GL, which is output from the image display device 11, into light flux in a parallel state. The image display device 11 and the optical projection system 12 are stored within the exterior case 13.

Meanwhile, the image display device 11 is an example of a "display unit".

The light guiding device 20 is formed by connecting a light guiding member 21 to an optical transmission member 23, and is a flat optical member which extends in parallel on the whole. The light guiding member 21 and the optical transmission member 23 are formed of a resin material which has a high light transmission property in a visible range.

The light guiding member 21 is a trapezoidal prism in plan view, and includes a first reflection surface 21a, a second reflection surface 21b, a third reflection surface 21c, and a fourth reflection surface 21d as side surfaces. The first reflection surface 21a, the second reflection surface 21b, and the third reflection surface 21c are total reflection surfaces using a difference in refractive index. The fourth reflection surface 21d includes a half mirror layer 28 which has a light transmission property and a light reflection property. The half mirror layer 28 is formed by forming, for example, a metal reflecting film or a dielectric multilayer using silver.

The first reflection surface 21a and the second reflection surface 21b face each other, correspond to the long side parts of the trapezoidal prism, and extend in the direction of the second optical axis AX2. The third reflection surface 21c and the fourth reflection surface 21d correspond to the slopes (short side parts) of the trapezoidal prism, and both are inclined at an acute angle of 45° or less with regard to the second optical axis AX2.

The image light GL, which is emitted from the image display device 11, is incident to the light guiding device 20, is reflected on the third reflection surface 21c in the direction of the second optical axis AX2, and faces the fourth reflection surface 21d.

That is, the image light GL, which is emitted from the image display device 11, passes through the light guiding member 21 of the light guiding device 20, is reflected on the fourth reflection surface 21d, and is incident to the eye EY of the wearer. Further, the outside light OL passes through the optical transmission member 23 and the light guiding member 21 (fourth reflection surface 21d), and is incident to the eye EY of the wearer. As a result, the wearer can recognize the virtual image and the external world image in a superimposed manner.

In the description below, it is assumed that a direction, which is parallel to the second optical axis AX2 and which faces from the fourth reflection surface 21d to the third reflection surface 21c, is an X direction. Further, it is assumed that a direction, which is parallel to the first optical axis AX1 and the third optical axis AX3 and which faces from the third reflection surface 21c to the image display device 11, is a Z direction. Further, it is assumed that a direction, which crosses the X direction and the Z direction, is a Y direction.

Meanwhile, the X direction is an example of the "first direction".

Overview of Image Forming Device

FIG. 3A is a diagram illustrating a first image forming device extracted from FIG. 2, and is a schematic cross-sectional diagram illustrating the configuration of the first image forming device. FIG. 3B is a schematic plan diagram viewed from a direction which crosses FIG. 3A, that is, a schematic plan diagram illustrating the first image forming device viewed from the Z (−) direction. Meanwhile, in FIGS. 3A and 3B, only components which are necessary for the description are shown in the drawing and components which are not necessary for the description are not shown in the drawing.

Hereinafter, the overview of the image forming device 10 will be described with reference to FIGS. 3A and 3B.

As described above, the image forming device 10 includes the image display device 11, the optical projection system 12, and the exterior case 13. As shown in FIGS. 3A and 3B, the exterior case 13 is formed by a wall 13-1, a wall 13-2, a wall 13-3, a wall 13-5, a wall 13-6, a wall 13-7, and a wall 13-8.

As described above, the wall 13-1 includes the contact surface 13-1A. In the drawing, the surface of the side of the −X direction of the wall 13-1 (surface on the side of the wearer M) is the contact surface 13-1A.

As shown in FIG. 3A, the wall 13-1, the wall 13-2, and the wall 13-3 are sequentially arranged along the X direction. Each of the wall 13-1, the wall 13-2, and the wall 13-3 has a rectangular shape which is long in the Z direction. At both ends of each of the wall 13-1, the wall 13-2, and the wall 13-3 in the Z direction, the wall 13-5 and the wall 13-6 are arranged.

Meanwhile, the wall 13-2 is an example of a "second wall" in Application Examples 4 to 8, and the wall 13-3 is an example of a "third wall" in Application Examples 4 to 8.

The wall 13-1 is arranged on the side of the wearer M, and includes a part which extends in the Z direction and parts which extend in the X direction. That is, the wall 13-1 includes parts which are curved in the X direction at both ends of the part which is long in the Z direction.

The wall 13-3 is arranged on the side of the housing 122 and is fixed (bonded) to the housing 122. The wall 13-5 is arranged on the side of the image display device 11, and the image display device 11 is fixed (bonded) thereto. The wall 13-6 is arranged on the side of the light guiding device 20, and the light guiding device 20 is fixed (bonded) thereto. The wall 13-6 has an opening 13-6CT, and thus the image light GL, which is emitted from the image display device 11, is incident to the third reflection surface 21c of the light guiding device 20.

Meanwhile, in order to prevent foreign matter from entering the image forming device 10 through the opening 13-6CT, a light transmitting member (for example, dust-proof glass) may be provided to cover the opening 13-6CT of the wall 13-6.

As shown in FIG. 3B, a wall 13-7 and a wall 13-8 are provided between the ends of the wall 13-1 in the Y direction and the ends of the wall 13-3 in the Y direction. The wall 13-7 and the wall 13-8 are long in the Z direction.

That is, the wall 13-1, the wall 13-3, the wall 13-5, the wall 13-6, the wall 13-7, and the wall 13-8 are arranged on the side of the surface of the exterior case 13, and the wall 13-2 is arranged inside the exterior case 13.

The image forming device 10 is formed with a first space 15 which is surrounded by the wall 13-1, the wall 13-2, the wall 13-7, and the wall 13-8 (refer to FIG. 3A). Further, the image forming device 10 is formed with a second space 16 which is surrounded by the wall 13-2, the wall 13-3, the wall 13-5, the wall 13-6, the wall 13-7, and the wall 13-8. The first space 15 and the second space 16 are filled with any one of atmospheric pressure air or depressurized air.

In other words, a space between the wall 13-1 and the wall 13-2 and a space between the wall 13-2 and the wall 13-3 are filled with any one of atmospheric pressure air or depressurized air.

The image display device 11 is arranged between the wall 13-2 and the wall 13-3. In addition, the first space 15 (air), the wall 13-2, and the second space 16 (air) are arranged between the wall 13-1 and the image display device 11. That is, the contact surface 13-1A (wall 13-1) is arranged to have two spaces (the first space 15 and the second space 16) from the image display device 11.

The walls 13-1, 13-2, 13-7, and 13-8 are formed of a material which does not conduct heat easily. For example, the walls 13-1, 13-2, 13-7, and 13-8 can be formed of a resin material, more specifically, a resin material such as polyolefin, fluoro resin, acryl, vinyl chloride, polyester, polystyrene, and an ABS resin.

The walls 13-3, 13-5, and 13-6 are formed of a material which conducts heat easily. It is preferable that a lightweight material, which conducts heat easily, be used as a material which forms the walls 13-3, 13-5, and 13-6. For example, light metal material, such as aluminum, aluminum alloy, magnesium, or magnesium alloy, can be used.

As described above, the thermal conductivity of the walls 13-1, 13-2, 13-7, and 13-8 is less than the thermal conductivity of the walls 13-3, 13-5, and 13-6.

Although details will be described later, the image display device 11 generates heat when electricity is supplied to the image display device 11 and the image display device 11 emits the image light GL. The image forming device 10 according to the embodiment reduces (suppresses) the effect of heat generated by the image display device 11. That is, in order to suppress the effect of the heat generated by the image display device 11, the image forming device 10 includes the wall 13-1, the first space 15, the wall 13-2, and the second space 16 between the wearer M and the image display device 11.

Since the walls 13-1 and 13-2 are formed of the material which does not conduct heat easily, heat is not transferred (propagated) easily to the side of the wearer M.

The first space 15 and the second space 16 are filled with any one of atmospheric pressure air or depressurized air. For example, the thermal conductivity of the atmospheric pressure air is 0.026 W/mK at room temperature. The thermal conductivity of a resin which forms the walls 13-1 and 13-2 is approximately 0.2 W/mK to 0.3 W/mK at room temperature. Since the thermal conductivity of the atmospheric pressure air is extremely small compared to the thermal conductivity of the resin, the first space 15 and the second space 16, which are filled with the atmospheric pressure air, do not conduct heat easily compared to the walls 13-1 and 13-2 which are formed of the resin, and have excellent thermal insulation property.

Therefore, when the wall 13-1 which is formed of the material which does not conduct heat easily, the first space 15 which does not conduct heat easily, the wall 13-2 which is formed of the material which does not conduct heat easily, and the second space 16 which does not conduct heat easily are arranged between the wearer M and the image display device 11, it is possible to cause heat generated by the image display device 11 to be not transferred (propagated) to the side of the wearer M easily.

That is, the image forming device 10 has excellent thermal insulation property in which heat generated by the image display device 11 is not transferred (propagated) to side of the wearer M easily.

Meanwhile, heat is transferred (propagated) from the wall 13-2 to the wall 13-1 due to the radiation of heat from the wall 13-2 in addition to the transfer (propagation) of heat due to the air with which the first space 15 is filled. Accordingly, it is preferable that the image forming device 10 reduce the transfer (propagation) of heat due to the air such that heat is mainly transferred (propagated) due to the radiation of heat from the wall 13-2.

That is, it is preferable that the first space 15 be filled with depressurized air and the thermal insulation of the first space 15 further increase.

When the space is not arranged between the wearer M and the image display device 11 and the walls 13-1 and 13-2, which are formed of a material which does not conduct heat easily, are arranged between the wearer M and the image display device 11, heat, which is transferred (propagated) from the image display device 11 to the wearer M is not sufficiently suppressed. Therefore, in order to sufficiently suppress heat, which is transferred (propagated) from the image display device 11 to the wearer M, it is important to arrange at least one space (the first space 15 or the second space 16) between the wearer M and the image display device 11.

If at least one of the walls 13-1 and 13-2 is formed of a material which does not conduct heat easily when at least one space is arranged between the wearer M and the image display device 11, it is possible to suppress discomfort due to a temperature rise even when the temperature of the wall 13-1 rises due to heat which is generated by the image display device 11, and thus it is possible to secure comfort (fit feeling). That is, at least one of the thermal conductivity of the wall 13-1 and the thermal conductivity of the wall 13-2 may be lower than the thermal conductivity of the wall 13-5. Meanwhile, although there is an individual difference in a fit feeling and there is a person who feels uncomfortable if temperature rises while wearing, a problem is recognized from a point of view in which it is further preferable that less temperature is transferred to the temples, in other words, the change in temperature is less when the apparatus is used.

In addition, in the image forming device 10, the image display device 11 is fixed to the wall 13-5, the wall 13-5 is connected to the wall 13-3, and the wall 13-3 is connected to the housing 122 and the wall 13-6. Accordingly, heat, which is generated by the image display device 11, is transferred (propagated) to the side of the wall 13-5, and is further transferred (propagated) to the side of the housing 122 and the wall 13-6 through the wall 13-3. Since the walls 13-3, 13-5, and 13-6 are formed of a material which conducts heat easily, heat, which is generated by the image display device 11, is caused to be rapidly and efficiently transferred (propagated) to the sides of the walls 13-3, 13-5, and 13-6, and thus it is possible to rapidly and efficiently radiate heat using the walls 13-3, 13-5, and 13-6 as heat radiation sections.

That is, the image forming device 10 has an excellent heat radiating property, which easily radiates heat, which is generated by the image display device 11, to a side which does not affect the wearer M.

Further, when the housing 122 is formed of the material which conducts heat easily, it is possible to rapidly and efficiently transfer (propagate) heat, which is generated by the image display device 11, to the side of the housing 122, and to rapidly and efficiently radiate heat using the housing 122 as the heat radiation section.

Meanwhile, as described above, the housing 122 includes parts which come into contact with the human body. It is preferable that the parts of the housing 122, which come into contact with the human body, be formed of the material which does not conduct heat easily, and the parts of the housing 122, which do not come into contact with the human body, be formed of the material which conducts heat easily and the parts of the housing 122, which do not come into contact with the human body, are used as the heat radiation sections.

As above, the image forming device 10 has excellent thermal insulation property in which heat is not transferred (propagated) to the side of the wearer M easily, and an excellent heat radiating property in which heat is radiated easily to the side which does not affect of the wearer M. Accordingly, it is possible to suppress the influence of heat which is generated by the image display device 11. That is, it is possible to suppress the temperature rise of the wall 13-1 due to heat which is generated by the image display device 11. Therefore, the influence of heat to the side of the wearer M is reduced.

Overview of Image Display Device

Figure 4:
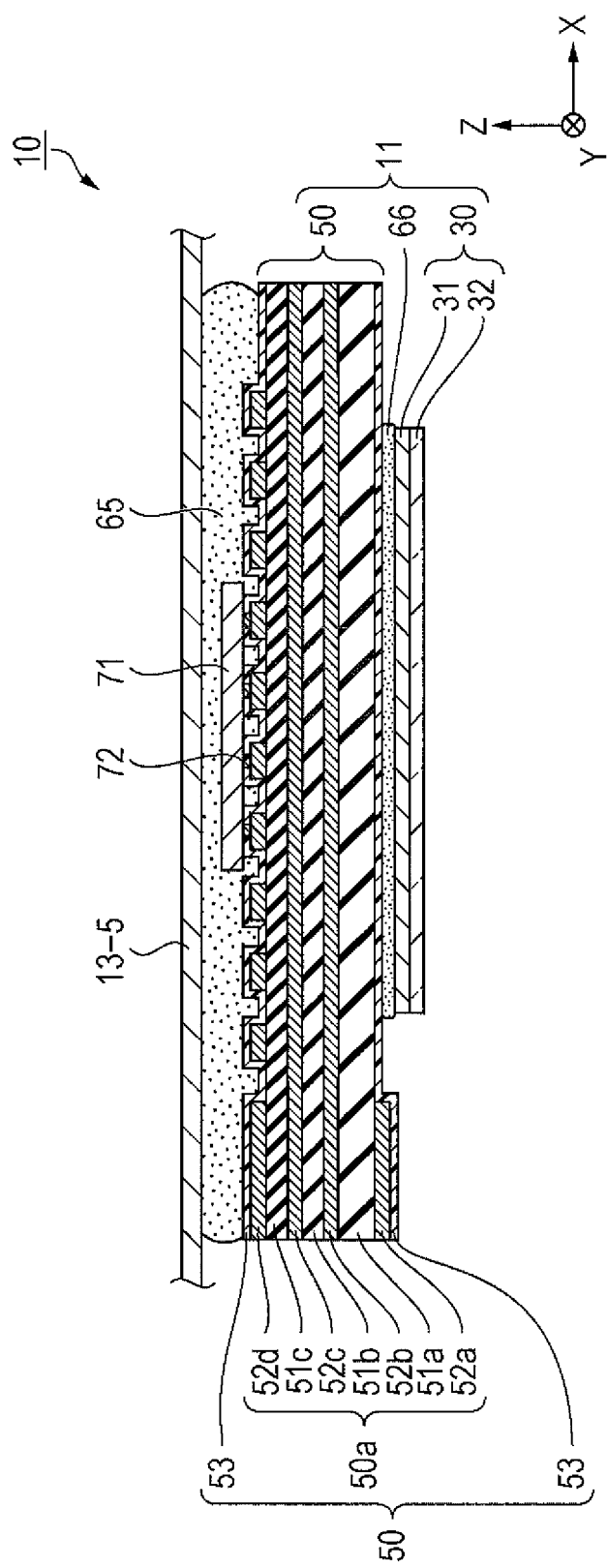
FIG. 4 is a schematic cross-sectional diagram illustrating the image display device in an area B surrounded by a dotted-line of FIG. 3A.

FIG. 4 is a schematic cross-sectional diagram illustrating the image display device in an area B surrounded by a dotted-line in FIG. 3A, and illustrates a state in which the image display device is fixed to (mounted on) the fifth wall. In FIG. 4, only components which are necessary for the description are shown, and components which are not necessary for the description are not shown in the drawing.

Hereinafter, the overview of the image display device 11 will be described with reference to FIG. 4.

As shown in FIG. 4, the image display device 11 includes a print substrate 50, an organic EL display device 30, and a semiconductor element 71. One of the surfaces of the print substrate 50 is bonded to the organic EL display device 30 by an adhesive 66. The semiconductor element 71 is mounted on the remaining surface of the print substrate 50, and the remaining surface is bonded to the wall 13-5 by an adhesive 65.

Meanwhile, although not shown in the drawing, the image display device 11 includes a connector and is connected to an external circuit (not shown in the drawing) through a flexible print substrate, a cable or the like.

Although the details will be described later, the organic EL display device 30 is the source of heat generation in the image display device 11. Heat, which is generated by the organic EL display device 30, is transferred (propagated) to the side of the wall 13-5 through the adhesive 66, the print substrate 50, and the adhesive 65.

Meanwhile, the adhesives 65 and 66 are formed of a heat conductive adhesive which transfers (propagates) heat easily.

The organic EL display device 30 includes an element substrate 31 and a sealing substrate 32. The element substrate 31 of the organic EL display device 30 includes organic EL elements 45 (refer to FIG. 6) which emit the image light GL, and is mounted on one of the surfaces of the print substrate 50 as described above. That is, the element substrate 31 of the organic EL display device 30 is bonded to one of the surfaces of the print substrate 50 by the adhesive 66.

The semiconductor element 71 is a control circuit which supplies various control signals to the organic EL display device 30, and is mounted on the remaining surface of the print substrate 50 as described above. Although not shown in the drawing, a plurality of electronic components, such as another semiconductor element (for example, a power circuit or the like), a resistance element, and a capacitance element, are mounted on the remaining surface of the print substrate 50, in addition to the semiconductor element 71.

The print substrate 50 is a member for wiring electronic components, such as the semiconductor element 71 and the organic EL display device 30, and includes a print substrate main body 50a and solder resists 53 which cover the surface of the print substrate main body 50a.

The print substrate main body 50a has a structure in which a conductive layer 52a, an insulating layer 51a, a conductive layer 52b, an insulating layer 51b, a conductive layer 52c, an insulating layer 51c, and a conductive layer 52d are laminated in the Z direction. That is, the print substrate main body 50a has a multi-layer structure in which the wiring layers and the insulating layers are alternately laminated.

The conductive layers 52a, 52b, 52c, and 52d are formed of, for example, metal such as copper, and have an excellent electrical conduction property and a heat conduction property. For example, a signal wiring, an electrode pad for supplying a signal to the organic EL display device 30, and the like are formed on the conductive layer 52a. For example, a ground wiring, to which ground potential is supplied, is formed on the conductive layer 52b. For example, a power supply wiring is formed on the conductive layer 52c. A signal wiring, an electrode pad for supplying a signal to the semiconductor element 71, and the like are formed on the conductive layer 52d.

The conductive layer 52b (ground wiring) and the conductive layer 52c (power supply wiring) have a solid pattern, and the conductive layer 52a (signal wiring and the electrode pad) and the conductive layer 52d (signal wiring and the electrode pad) are patterned in the form of a wiring or terminal (electrode pad).

The insulating layers 51a, 51b, and 51c are formed of, for example, an organic material such as an epoxy based material or a polyimide based material. The insulating layers 51a, 51b, and 51c may be formed of an inorganic material, such as ceramics, or a composite material acquired by impregnating a glass fiber with the organic material.

Meanwhile, although not shown in the drawing, via holes are formed in the insulating layers 51a, 51b, and 51c, and thus the conductive layers 52a, 52b, 52c, and 52d are stereoscopically wired due to the via holes.

Further, the surface of the print substrate main body 50a on the side in which the organic EL display device 30 is mounted, and the surface of the print substrate main body 50a on the side in which the semiconductor element 71 is mounted are covered by the solder resists 53. The solder resists 53 are insulating layers which protect the conductive layer 52a and the conductive layer 52d which are provided on the surfaces of the print substrate main body 50a.

As above, the print substrate 50 has the multi-layer structure in which the conductive layers (the conductive layers 52a, 52b, 52c, and 52d) and the insulating layers (the solder resists 53, and the insulating layers 51a, 51b, and 51c) are alternately laminated in the Z direction. The heat conduction property of the print substrate 50 in the Z direction is improved by the conductive layers 52a, 52b, 52c, and 52d which are excellent in a heat conduction property, and thus heat is efficiently transferred (propagated) in the Z direction.

On the side, in which the semiconductor element 71 is mounted, of the print substrate 50, the semiconductor element 71 includes bumps 72, and is connected to (mounted on) the electrode pad which is formed on the conductive layer 52d.

On the side, in which the organic EL display device 30 is mounted, of the print substrate 50, the external connection terminals 37 of the organic EL display device 30 (refer to FIG. 5) are connected to (mounted on) the electrode pad which is formed on the conductive layer 52a due to a bonding wire (not shown in the drawing). That is, the organic EL display device 30 is mounted on the print substrate 50 through wire bonding.

Overview of Organic EL Display Device

Figure 5:
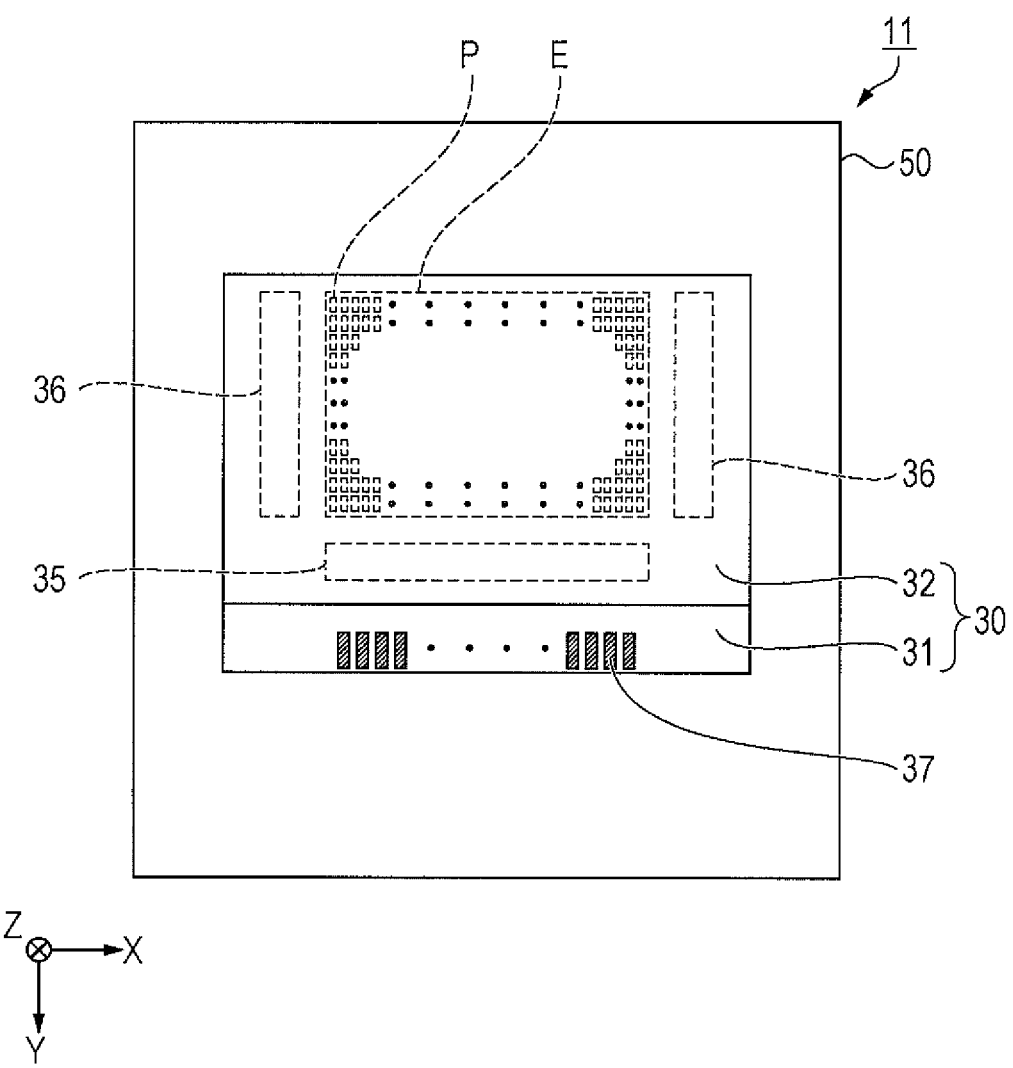
FIG. 5 is a schematic plan diagram illustrating the image display device on a side in which an organic EL display device is mounted.
Figure 6:
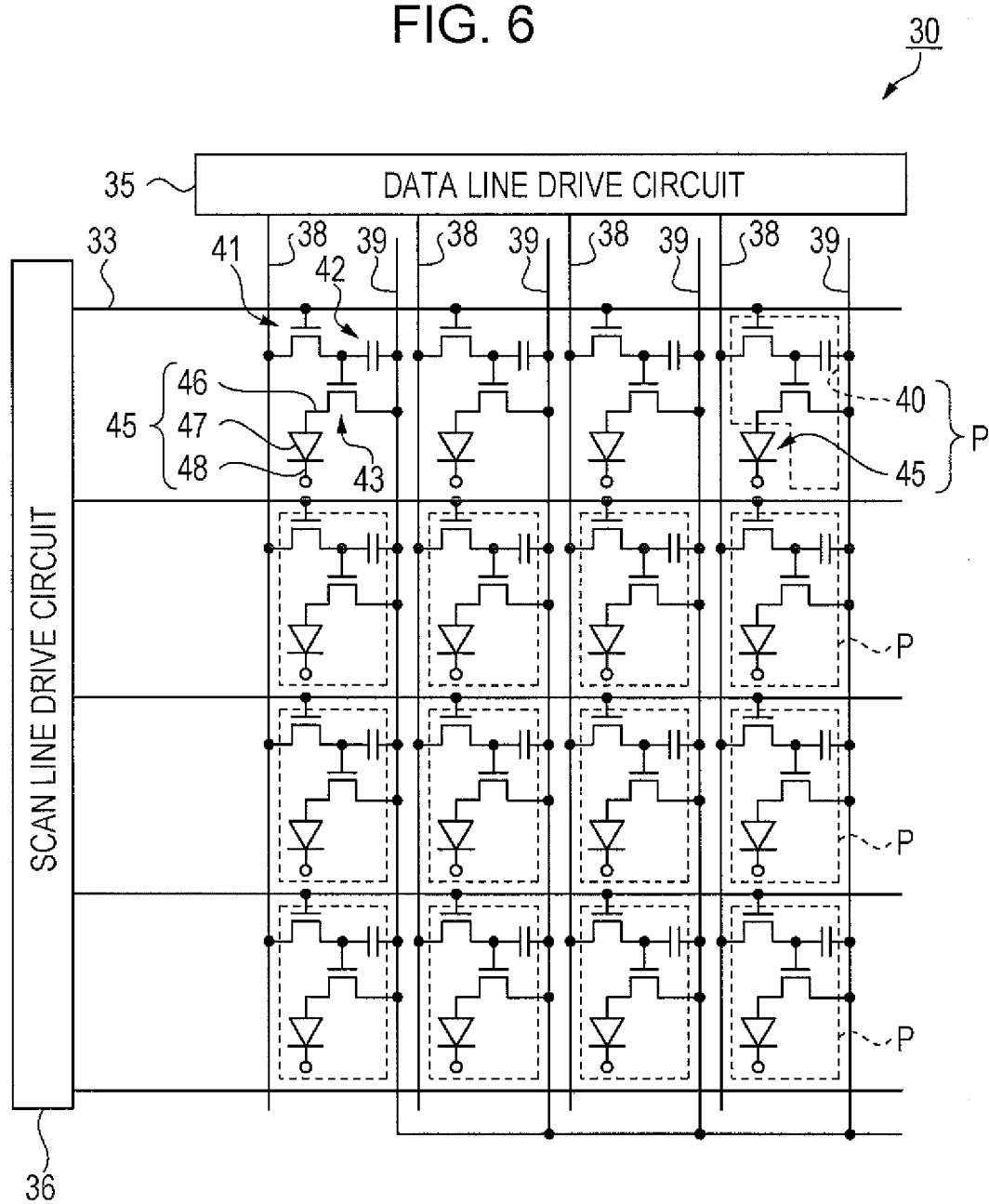
FIG. 6 is an equivalent circuit diagram illustrating the electrical configuration of the organic EL display device.

FIG. 5 is a schematic plan diagram illustrating the image display device on the side in which the organic EL display device is mounted. FIG. 6 is an equivalent circuit diagram illustrating the electrical configuration of the organic EL display device. In FIGS. 5 and 6, only components which are necessary for the description are shown in the drawing and components which are not necessary for the description are not shown in the drawing.

Subsequently, the overview of the organic EL display device 30 will be described with reference to FIGS. 5 and 6.

As shown in FIG. 5, the organic EL display device 30 is fixed to one of the surfaces of the print substrate 50. The organic EL display device 30 includes the element substrate 31 and the sealing substrate 32, and both the substrates are bonded to each other through a resin layer (not shown in the drawing).

A plurality of pixels P which are arranged in a matrix shape in a display area E, a drive circuit (a data line drive circuit 35 and scan line drive circuits 36) which drives the plurality of pixels P, the external connection terminals 37, and the like are formed on the element substrate 31. More specifically, the element substrate 31 is a semiconductor substrate (silicon substrate) on which the pixels P, the data line drive circuit 35, the scan line drive circuits 36, the external connection terminals 37, and the like are formed. That is, the element substrate 31 is formed of a semiconductor substrate (silicon substrate) which has an excellent heat conduction property.

The plurality of external connection terminals 37 are arranged along the first side of the element substrate 31. The data line drive circuit 35 is arranged between the plurality of external connection terminals 37 and the display area E. The scan line drive circuits 36 are arranged between a second side and a third side, which are perpendicular to the first side and which face each other, and the display area E.

The sealing substrate 32 is smaller than the element substrate 31, and is arranged such that the external connection terminals 37 are exposed. The sealing substrate 32 is an insulating substrate having a light transmitting property, and it is possible to use a quartz substrate, a glass substrate, or the like as the sealing substrate. The sealing substrate 32 has a function to protect the organic EL elements 45 (refer to FIG. 6), which are arranged in the display area E and which will be described later, from damage. Further, the sealing substrate 32 is widely provided compared to the display area E. In addition, the sealing substrate 32 is a surface of the organic EL display device 30 on a side in which the image light GL is emitted.

Meanwhile, a protection glass, which protects the organic EL display device 30, may be arranged on the surface of the sealing substrate 32, which is an opposite side surface of the element substrate 31.

As shown in FIG. 6, the organic EL display device 30 includes a plurality of scan lines 33 and a plurality of data lines 38 which cross each other, and a plurality of power lines 39 which are in parallel to the plurality of data lines 38, respectively. The scan lines 33 are connected to the scan line drive circuits 36, and the data lines 38 are connected to the data line drive circuit 35. In addition, the pixels P are arranged in a matrix shape so as to correspond to the respective intersections of the plurality of scan lines 33 and the plurality of data lines 38.

Each of the pixels P includes the organic EL element 45 which is a light emitting element, and a pixel circuit 40 which controls the drive (light emission) of the organic EL element 45.

The organic EL element 45 includes a pixel electrode 46 which functions as the anode, a counter electrode 48 which functions as the cathode, and a light emitting function layer 47 which includes an organic light emitting layer provided between the pixel electrode 46 and the counter electrode 48. The organic EL element 45 can perform electrical recording as a diode, and the light emitting function layer 47 emits light according to a current which flows through the organic EL element 45. More specifically, holes are supplied from the pixel electrode 46 to the light emitting function layer 47, electrons are supplied from the counter electrode 48 to the light emitting function layer 47, the holes are coupled to the electrons in the light emitting function layer 47, and thus the light emitting function layer 47 emits light.

The pixel circuit 40 includes a switching transistor 41, a storage capacity 42, and a driving transistor 43. It is possible to form the two transistors 41 and 43 using, for example, an n-channel type or p-channel type transistor or the like.

The gate of the switching transistor 41 is connected to the scan line 33. One of the source and the drain of the switching transistor 41 is connected to the data line 38. The remaining one of the source and the drain of the switching transistor 41 is connected to the gate of the driving transistor 43.

One of the source and the drain of the driving transistor 43 is connected to the pixel electrode 46 of the organic EL element 45. The remaining one of the source and the drain of the driving transistor 43 is connected to the power line 39. The storage capacity 42 is connected between the gate of the driving transistor 43 and the power line 39.

When the scan line 33 is driven and the switching transistor 41 is turned on, an electrical potential based on the image signal, supplied from the data line 38 at this time, is maintained in the storage capacity 42 through the switching transistor 41. Whether to turn on or off the driving transistor 43 is determined according to an electrical potential of the storage capacity 42, that is, the gate electrical potential of the driving transistor 43. Further, when the driving transistor 43 is turned on, an amount of current according to the gate electrical potential flows to the light emitting function layer 47, which is interposed between the pixel electrode 46 and the counter electrode 48, from the power line 39 through the driving transistor 43. The organic EL element 45 emits light according to the amount of current which flows to the light emitting function layer 47.

The scan line drive circuit 36 supplies a scan signal to perform control such that the switching transistor 41 is turned on or off. The data line drive circuit 35 controls a current such that the organic EL element 45 emits light. Therefore, since a large amount of current flows through the data line drive circuit 35 compared to the scan line drive circuit 36, heat is generated due to the current. Further, the organic EL element 45 also generates heat due to the current which flows through the organic EL element 45. Since the data line drive circuit 35 controls the whole current which flows through the plurality of organic EL elements 45, a large amount of current flows compared to the current which flows through the single organic EL element 45, and thus a heat generation rate is greater than that of the single organic EL element 45.

Heat generated by the data line drive circuit 35 is transferred (propagated) to the organic EL element 45 through the base material (silicon substrate) of the element substrate 31 which has an excellent heat conduction property. That is, the organic EL element 45 receives an influence of heat generated by the data line drive circuit 35 in addition to heat generated by the current which flows through the organic EL element 45, and thus there is a problem in that the temperature of the organic EL element 45 rises. When the temperature of the light emitting function layer 47 of the organic EL element 45 rises, the deterioration in the light emitting function layer 47 of the organic EL element 45 is accelerated, and thus there is a problem in that the life of the organic EL element 45 is shortened.

Heat, generated by the data line drive circuit 35 and the organic EL elements 45, is rapidly and efficiently transferred (propagated) to the wall 13-5 through the base material (silicon substrate) of the element substrate 31 which has an excellent heat conduction property, the adhesive 66 which has an excellent heat conduction property, the print substrate 50 which has an excellent heat conduction property, and the adhesive 65 which has an excellent heat conduction property.

Further, heat, which is transferred (propagated) to the wall 13-5, is transferred (propagated) to the wall 13-3 which has an excellent heat conduction property and a part of the housing 122, which has an excellent heat conduction property. Heat, which is generated by the data line drive circuit 35 and the organic EL elements 45, is radiated while using the walls 13-3, 13-5, and 13-6 and the part of the housing 122, which has an excellent heat conduction property, as the heat radiation sections.

Accordingly, the influence of heat, which is generated by the data line drive circuit 35 and the organic EL elements 45, that is, the temperature rise of the organic EL element 45 is suppressed, and thus it is possible to suppress the deterioration of the organic EL element 45. That is, it is possible to increase the reliability of the organic EL element 45.

As above, the image forming device 10 according to the embodiment has an advantage in that the deterioration of the organic EL element 45 is suppressed in addition to an advantage in that heat is not transmitted to the wearer M easily. Accordingly, the image forming device 10 according to the embodiment has excellent reliability.

Second Embodiment

FIG. 7A is a diagram corresponding to FIG. 3A, and is a schematic cross-sectional diagram illustrating the configuration of an image forming device according to a second embodiment. FIG. 7B is a schematic plan diagram illustrating the image forming device viewed from a direction which is perpendicular to FIG. 7A, that is, a schematic plan diagram illustrating the image forming device viewed from the Z(−) direction.

The main different point between an image forming device 10 according to the embodiment and the image forming device 10 according to the first embodiment is that a wall 13-4 is provided on the side of the housing 122, and a third space 17 is formed between the image display device 11 and the housing 122.

Hereinafter, the different point between the image forming device 10 according to the embodiment and the image forming device 10 according to the first embodiment will be mainly described with reference to FIGS. 7A and 7B. In addition, the same reference numerals are attached to the same components as in the first embodiment, and the description thereof will not be repeated.

As shown in FIG. 7A, the wall 13-1, the wall 13-2, the wall 13-3, and the wall 13-4 are sequentially arranged along the X direction. The wall 13-1, the wall 13-2, the wall 13-3, and the wall 13-4 have a rectangular shape which is long in the Z direction.

Meanwhile, the wall 13-4 is an example of a "fourth wall".

The wall 13-4 is arranged on the side of the housing 122, and is fixed (bonded) to the housing 122. The wall 13-4 includes a part which extends in the Z direction, and parts which are curved in the X direction at both ends of the part which extends in the Z direction.

That is, the wall 13-1 and the wall 13-4 have a bisymmetric form while interposing the image display device 11 therebetween.

As shown in FIG. 7B, the wall 13-7 and the wall 13-8 are arranged between the ends of the wall 13-1 in the Y direction and the ends of the wall 13-4 in the Y direction. The wall 13-7 and the wall 13-8 are long in the Z direction.

That is, the wall 13-1, the wall 13-4, the wall 13-5, the wall 13-6, the wall 13-7, and the wall 13-8 are arranged on the side of the surface of the exterior case 13, and the wall 13-2 and the wall 13-3 are arranged inside the exterior case 13.

In the image forming device 10, a first space 15 (FIG. 7A), which is surrounded by the wall 13-1, the wall 13-2, the wall 13-7, and the wall 13-8, is formed between the wall 13-1 and the wall 13-2. Further, a second space 16 (FIG. 7A), which is surrounded by the wall 13-2, the wall 13-3, the wall 13-5, the wall 13-6, the wall 13-7, and the wall 13-8, is formed between the wall 13-2 and the wall 13-3. Further, a third space 17 (FIG. 7A), which is surrounded by the wall 13-3, the wall 13-4, the wall 13-7, and the wall 13-8, is formed between the wall 13-3 and the wall 13-4. Also, the third space 17 may be connected to the first space 15.

The first space 15, the second space 16, and the third space 17 are filled with any one of atmospheric pressure air and depressurized air.

In other words, a space between the wall 13-1 and the wall 13-2, space between the wall 13-2 and the wall 13-3, and a space between the wall 13-3 and the wall 13-4 are filled with any one of atmospheric pressure air and depressurized air.

The wall 13-3 and the wall 13-4 are formed of a material which does not conduct heat easily. For example, the wall 13-3 and the wall 13-4 can be formed of a resin material, more specifically, a resin material such as polyolefin, fluororesin, acryl, vinyl chloride, polyester, polystyrene, or an ABS resin.

Meanwhile, the wall 13-3 according to the first embodiment is formed of a material which conducts heat easily, and this is the different point between the embodiment and the first embodiment.

In the image forming device 10 according to the embodiment, the wall 13-3 which does not conduct heat easily, the third space 17 (air) which further does not conduct heat easily, and the wall 13-4 which does not conduct heat easily are arranged between the image display device 11 and the housing 122. Accordingly, heat, which is generated by the image display device 11, is not transferred (propagated) easily to the side of the housing 122.

The wearer M holds the housing 122 and detaches the virtual image display device 100. If heat, which is generated by the image display device 11, is transferred (propagated) to the side of the housing 122 and, for example, the temperature of the housing 122 rises, the wearer M may feel uncomfortable when holding the housing 122. However, since heat, which is generated by the image display device 11, is not transferred (propagated) easily to the side of the housing 122, it is possible to suppress uncomfortable feeling.

Third Embodiment

Figure 8:
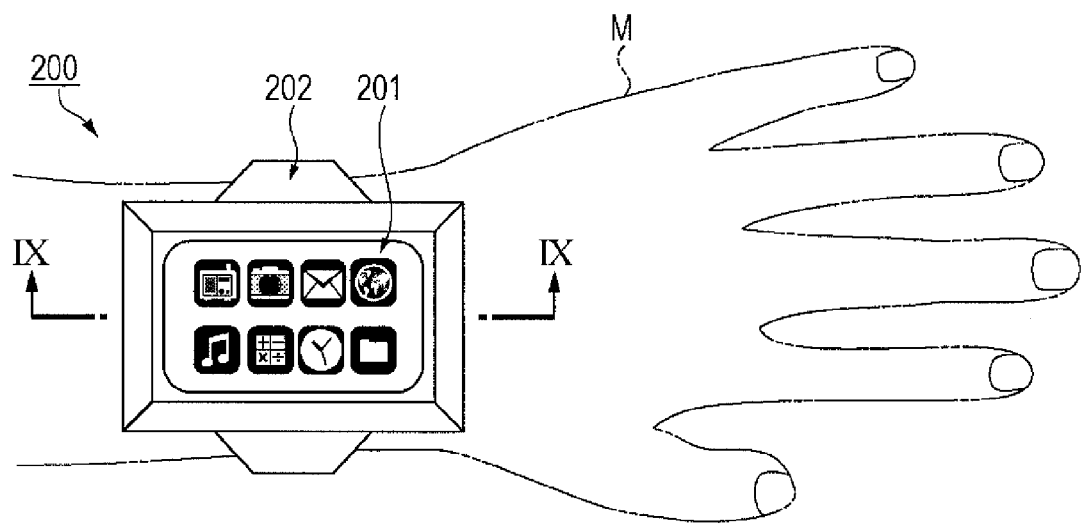
FIG. 8 is a schematic diagram illustrating the configuration of a smart watch according to a third embodiment.
Figure 9:
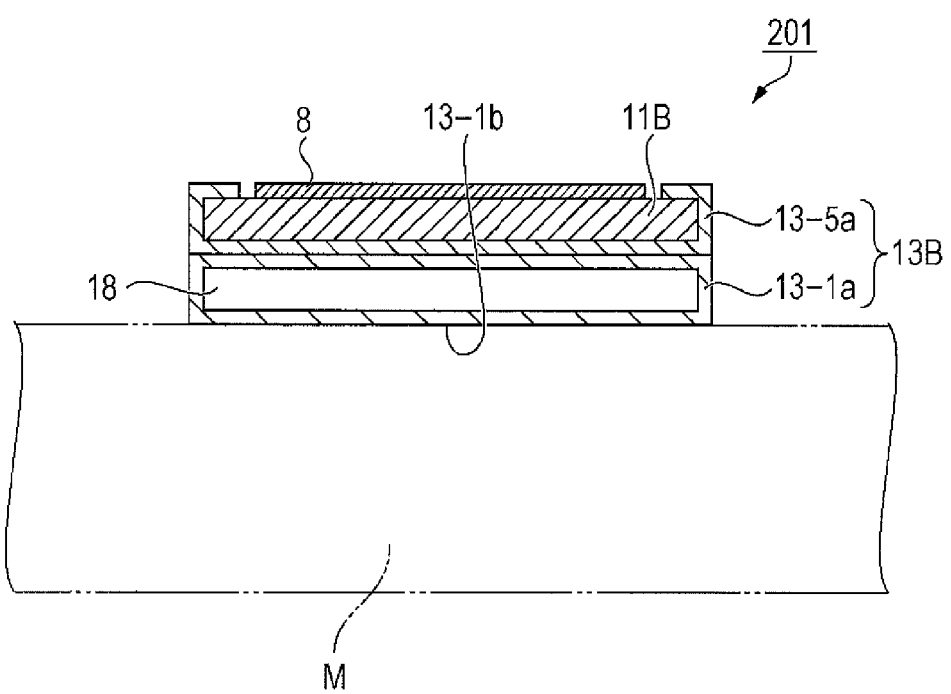
FIG. 9 is a schematic cross-sectional diagram illustrating a display unit taken along line IX-IX of FIG. 8.

FIG. 8 is a schematic diagram illustrating the configuration of a smart watch according to a third embodiment. FIG. 9 is a schematic cross-sectional diagram illustrating a display unit taken along a line IX-IX of FIG. 8.

Hereinafter, the overview of a smart watch 200 according to the embodiment will be described with reference to FIGS. 8 and 9.

The smart watch 200 is an example of an "electronic apparatus", and is a wearable watch which has a function of a computer, a watch, or the like. The smart watch 200 is worn on the arm of the wearer M, and includes a display unit 201 which has a function to input and process data and a function to display the data, and a main body unit 202 which has a function for wireless communication and a function to process the data, as shown in FIG. 8.

Meanwhile, the display unit 201 is an example of an "electro-optical apparatus".

The display unit 201 displays icons indicative of various processes, time (not shown in the drawing), and the like. The wearer M can perform the various processes by touching the icons (touch panel 8 (refer to FIG. 9)) of the display unit 201.

The display unit 201 is formed by removing the optical projection system 12 from the image forming device 10 according to the first embodiment, and newly adding the touch panel 8. As shown in FIG. 9, in the display unit 201, an exterior case 13B, an image display device 11B, and the touch panel 8 are sequentially arranged from the side of the wearer M.

The exterior case 13B includes a casing member 13-1a and a holding member 13-5a. The surface 13-1b of the casing member 13-1a on the side of the wearer M is a contact surface. The casing member 13-1a includes a space (cavity) 18 inside. The space 18 is filled with atmospheric pressure air or depressurized air, and has an excellent thermal insulation property. The holding member 13-5a is curved on the side of the touch panel 8, and holds (contains) the image display device 11B.

The casing member 13-1a is formed of a material which does not conduct heat easily, and the holding member 13-5a is formed of a material which conducts heat easily. That is, the thermal conductivity of the casing member 13-1a is smaller than the thermal conductivity of the holding member 13-5a.

The image display device 11B has the same configuration as the image display device 11 according to the first embodiment, and generates heat when electricity is supplied to the organic EL display device 30 (refer to FIG. 4) and an image is displayed.

The touch panel 8 is a data input unit of the display unit 201.

Since the casing member 13-1a which does not conduct heat easily and the space 18 which has the excellent thermal insulation property are arranged between the image display device 11B and the wearer M, heat, which is generated by the image display device 11B, is not transferred (propagated) easily to the side of the wearer M.

The present application is not limited to the embodiments and can be appropriately modified without departing from the gist or spirit of the invention which is read from the claims and the whole specification. An electro-optical apparatus accompanying such modification and an electronic apparatus on which the electro-optical apparatus is mounted are included in the technical scope of the present application. In addition to the embodiments, various modification examples are conceivable. Hereinafter, modification examples will be described.

FIRST MODIFICATION EXAMPLE

The image display device 11 included in the image forming device 10 or the display unit 201 is not limited to the above-described image display device 11. For example, the image display device 11 may include a liquid crystal display device instead of the organic EL display device 30.

SECOND MODIFICATION EXAMPLE

An electronic apparatus, to which the image forming device 10 or the display unit 201 is applied, is not limited to the above-described virtual image display device 100 or the smart watch 200. For example, it is possible to apply the above-described image forming device 10 or the display unit 201 to a wearable computer or a wearable phone, which can be attachable to and detachable from the human body. That is, the image forming device 10 or the display unit 201 is suitable for the display unit of the electronic apparatus (wearable apparatus) which can be attachable to and detachable from the human body.

THIRD MODIFICATION EXAMPLE

Figure 10:
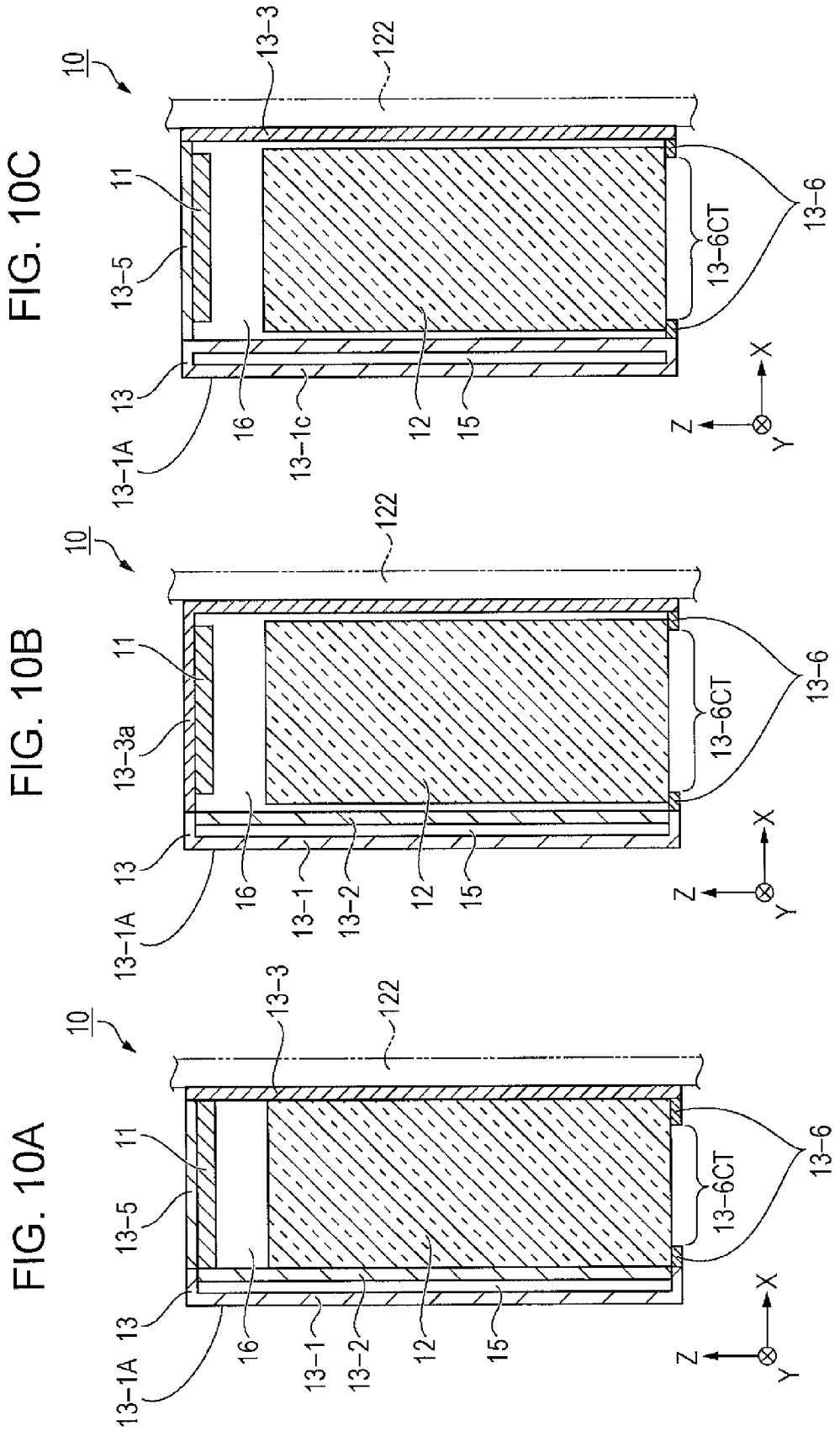
FIGS. 10A to 10C are schematic cross-sectional diagrams illustrating an image forming device according to a third modification example.

FIGS. 10A to 10C are diagrams corresponding to FIG. 3A, and are schematic cross-sectional diagrams illustrating an image forming device according to a third modification example. In the modification example, the configuration (form) of an exterior case is different from the exterior case 13 according to the first embodiment, and the other configurations are the same as in the first embodiment.

As shown in FIG. 10A, an image display device 11 is arranged between the wall 13-2 and the wall 13-3 to come into contact with the wall 13-2 and the wall 13-3. In contrast, the wall 13-2 and the wall 13-3 according to the first embodiment are arranged to be separated from the image display device 11 (refer to FIG. 3A). This point is the main different point between the modification example and the first embodiment.

In the modification example, the wall 13-1 which does not conduct heat easily, a first space 15 (air) which does not conduct heat easily, and the wall 13-2 which does not conduct heat easily are arranged between the wearer M and the image display device 11, and thus heat, which is generated by the image display device 11, is not transferred (propagated) easily to the side of the wearer M (contact surface 13-1A).

Meanwhile, in order to cause heat, which is generated by the image display device 11, to be not transferred (propagated) easily to the side of the wearer M, at least one space (first space 15) may be arranged between the wearer M and the image display device 11. Compared to the first embodiment, it is possible to cause the image display device 11 to be thin by reducing the number of spaces which are arranged between the wearer M and the image display device 11.

As shown in FIG. 10B, the wall 13-3a has an L-shaped form, and is arranged on the side of a housing 122 and on the side of the image display device 11. The housing 122 and the image display device 11 are fixed (bonded) to the wall 13-3a.

That is, the wall 13-3a according to the modification example has a form in which the wall 13-3 and the wall 13-5 according to the first embodiment are integrated. This point is the main different point between the modification example and the first embodiment.

When the wall 13-3 and the wall 13-5 according to the first embodiment are integrated, a heat transfer (propagation) loss is reduced at a contact section between the wall 13-3 and the wall 13-5 according to the first embodiment. Therefore, in the modification example, it is possible to improve heat propagation from the image display device 11 to the housing 122, compared to the first embodiment.

As shown in FIG. 10C, a first space 15 is formed in a casing member 13-1c which includes a cavity. In the first embodiment, the first space 15 (refer to FIGS. 3A and 3B) is formed in the area which is surrounded by the wall 13-1, the wall 13-2, the wall 13-7, and the wall 13-8. This point is the main different point between the modification example and the first embodiment.

That is, the casing member 13-1c according to the modification example corresponds to a member in which the wall 13-1, the wall 13-2, the wall 13-7, and the wall 13-8 according to the first embodiment are integrated. According to the configuration, it is possible to improve the air tightness of the member which forms the first space 15. For example, if the air tightness of the member which forms the first space 15 is improved when the first space 15 is filled with depressurized air, it is possible to suppress the change in pressure of air, with which the first space 15 is filled, and to maintain the excellent thermal insulation property of the first space 15.

FOURTH MODIFICATION EXAMPLE

Although the image display device 11 is fixed to the wall 13-5 in the image forming device 10 according to the first embodiment, the invention is not limited thereto. For example, the image display device 11 may be fixed to any one of the wall 13-3, the wall 13-7, and the wall 13-8. Meanwhile, it is preferable that the wall, to which the image display device 11 is fixed, be formed of a material which has an excellent heat conduction property.

Further, the spaces 15, 16, and 17 are filled with atmospheric pressure air or depressurized air, the invention is not limited thereto. The space 15, 16, and 17 may be filled with atmospheric pressure gas (air) or depressurized gas (air), and, for example, the space 15, 16, and 17 may be filled with atmospheric pressure nitrogen or depressurized nitrogen.

Further, in the image forming device 10 according to the first embodiment, the exterior case 13, which contains the image display device 11 and the optical projection system 12, and the housing 122, which is the housing of the virtual image display device 100, are separately formed. However, the invention is not limited thereto. For example, a part of the housing 122, which is the housing of the virtual image display device 100, may be formed as a part of the exterior case 13. In addition, the image display device 11 and the optical projection system 12 may be contained in the virtual image display device 100. In these configurations, it is preferable to arrange at least one space, which is filled with atmospheric pressure gas (air) or depressurized gas (air), between the contact surface 13-1A and the image display device 11 which is the source of heat generation.

FIFTH MODIFICATION EXAMPLE

Description will be made with reference to FIG. 1.

In the above embodiments and the modification examples, description has been made such that the wall 13-1 on the side of the human body (wearing person) comes into contact with the temples. However, the invention is not limited to the configuration and the wall 13-1 may be separated from the temples. In other words, a gap may be provided between the wall 13-1, which is positioned on the side of the wearing person, and the temples. For example, the first image forming device 10, which has a box shape, is projected out over the inside of the housing 122 in FIG. 1. However, the first image forming device 10 may be projected out over the outside of the housing 122. It is the same as in the second image forming device 9.

Even in the configuration, the virtual image display device 100 is mounted on the head using a pad section, which is hung on the nose of the wearing person, and crain sections of the housing 122, which are hung on ears, similarly to glasses, and thus there is no problem of wearability. Further, a gap is formed between the image forming device 9 or 10, which is a heat generation section, and the temples, and the gap functions as an insulation space (insulation section), and thus it is possible to reduce the heat propagation to the temples.

Fourth Embodiment

Overview of Virtual Image Display Device

A virtual image display device 101 according to a fourth embodiment is an example of an "electronic apparatus", and is a Head-Mounted Display (HMD) device which has appearance like glasses and which is worn on the head of a human body.

Figure 11:
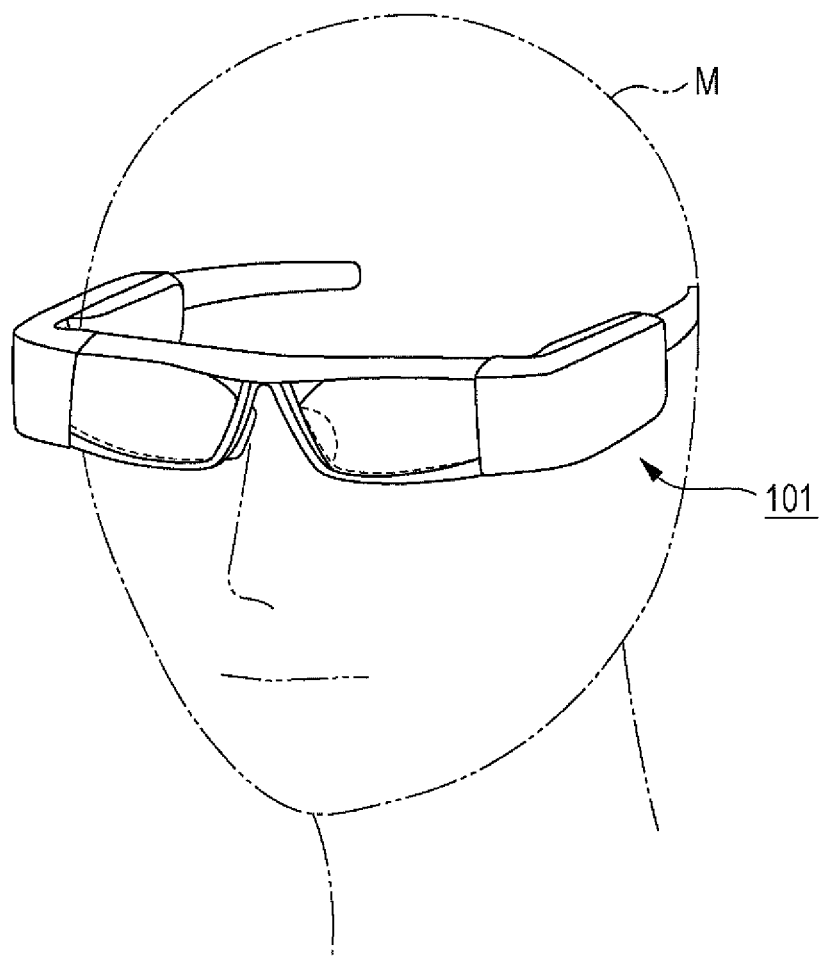
FIG. 11 is a diagram illustrating a form in which a virtual image display device according to a fourth embodiment is used.
Figure 12:
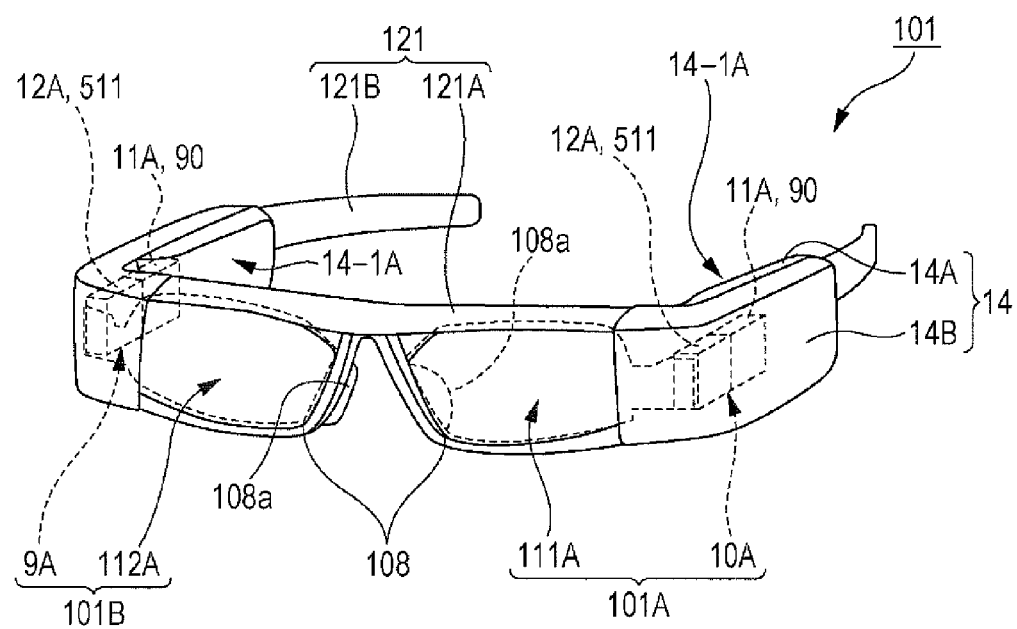
FIG. 12 is a schematic diagram illustrating the configuration of the virtual image display device according to the fourth embodiment.
Figure 13:
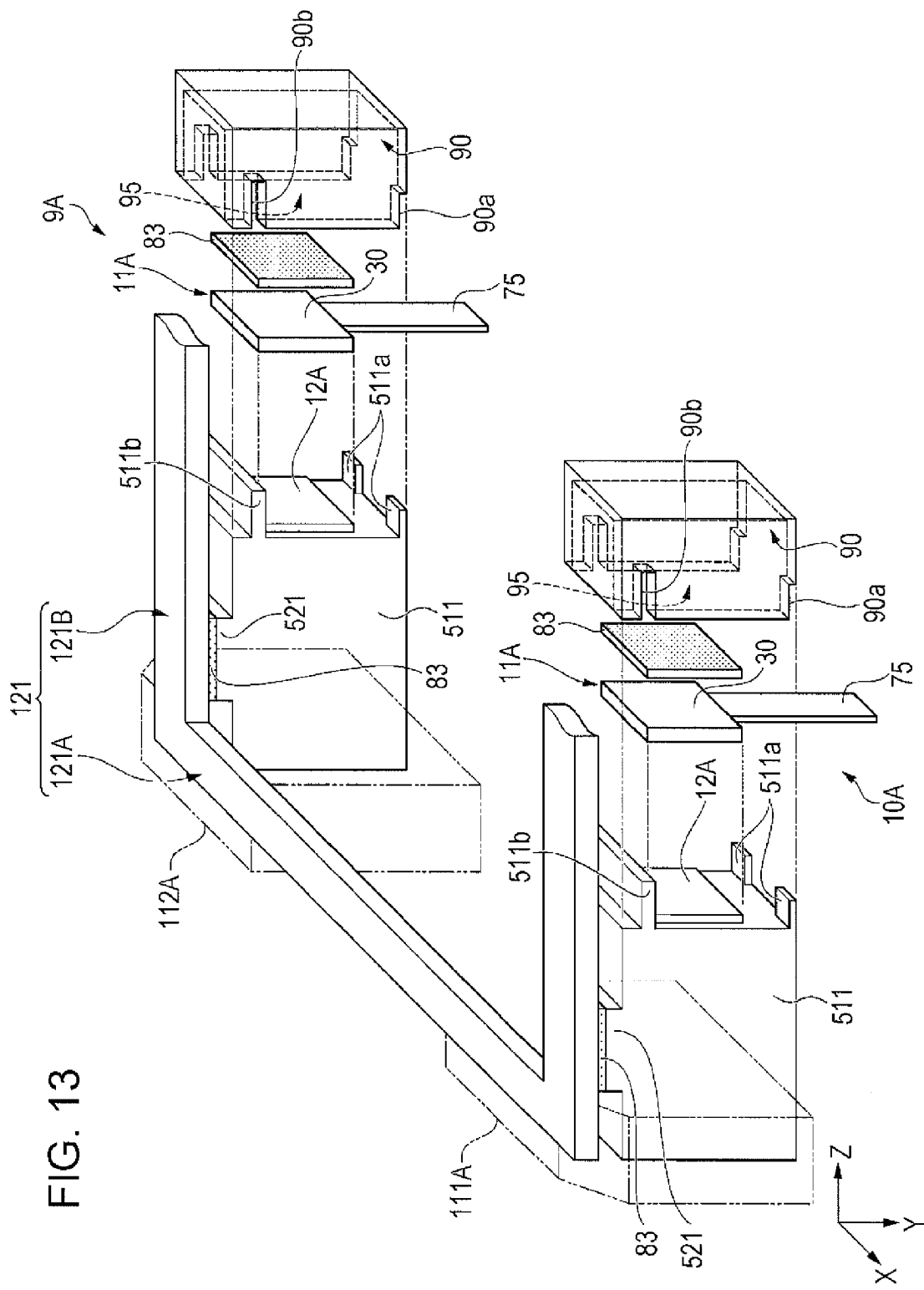
FIG. 13 is a schematic diagram illustrating a state of a part which is covered by an exterior case.

FIG. 11 is a diagram illustrating a form in which the virtual image display device according to the embodiment is used. FIG. 12 is a schematic diagram illustrating the configuration of the virtual image display device according to the embodiment. FIG. 13 is a schematic diagram (exploded perspective diagram) illustrating a state of a part which is covered by the exterior case. In FIG. 13, the exterior case 14 is not shown in the drawing.

Hereinafter, the overview of the virtual image display device 101 will be described with reference to FIGS. 11 to 13.

As shown in FIG. 11, the virtual image display device 101 is used after being worn on the head of the wearer M. The virtual image display device 101 has a see-through function, and the wearer M can simultaneously observe a virtual image formed by image light of the virtual image display device 101 and an external world image (actual image) formed by outside light.

As shown in FIG. 12, the virtual image display device 101 includes a first optical panel 111A and a second optical panel 112A, which cover the front of the eyes of the wearer M in a manner as to allow seeing through thereof, a first image forming device 10A, a second image forming device 9A, and a housing 121.

Meanwhile, the first image forming device 10A and the second image forming device 9A are display devices which are wearable on the human body, and are examples of the "electro-optical apparatus".

The first optical panel 111A and the second optical panel 112A are arc-like members which are bent along the face of the wearer M, and include a prism section (light guiding member) for light guiding and seeing through, and an optical transmission section (optical transmission member) for seeing through. The first optical panel 111A and the second optical panel 112A are formed of a resin material which has a high light transmission property in the visible range, and are formed by pouring, for example, a thermoplastic resin into a mold and solidifying the thermoplastic resin. In the first optical panel 111A and the second optical panel 112A, the prism section enables the image light to be wave-guided and to be emitted, and enables outside light to be seen-through, and the optical transmission section has a high light transmission property in the visible range.

The first display device 101A, in which the first optical panel 111A and the first image forming device 10A on the right side of the drawing are combined, forms a left eye virtual image, and functions as a virtual image display device individually. In addition, the second display device 101B, in which the second optical panel 112A and the second image forming device 9A on the left side of the drawing are combined, forms a right eye virtual image, and functions as a virtual image display device individually.

Meanwhile, the second display device 101B is acquired when the first display device 101A is horizontally inverted, and the second display device 101B has the same structure (configuration) as the first display device 101A. In the same manner, the second image forming device 9A is acquired when the first image forming device 10A is horizontally inverted, and the second image forming device 9A has the same structure (configuration) as the first image forming device 10A.

The housing 121 is a long and slender plate member which is curved in an U-shaped form. The housing 121 maintains the first optical panel 111A, the second optical panel 112A, the first image forming device 10A, and the second image forming device 9A. The housing 121 includes a frame 121A which horizontally extends in the drawing, and crain sections 121B which extend backward from both the horizontal ends of the frame 121A.

In the description below, it is assumed that a direction along the frame 121A is an X direction, a direction along the crain sections 121B is a Z direction, and a direction which crosses the X direction and the Z direction is a Y direction.

The frame 121A and the crain sections 121B are formed of a light material which conducts heat easily. The frame 121A and the crain sections 121B are formed of, for example, a light metal material such as aluminum, aluminum alloy, magnesium, and magnesium alloy.

The frame 121A maintains the optical panels 111A and 112A in a state in which the optical panels 111A and 112A are aligned at predetermined positions. The crain sections 121B maintain the image forming device 9A and 10A in a state in which the image forming device 9A and 10A are aligned at predetermined positions. Meanwhile, the crain sections 121B may have a hinge structure, and, in this case, the crain sections 121B can be folded.

The frame 121A is provided with protectors 108 for protecting the lower side sections of the optical panels 111A and 112A. The protectors 108 are respectively formed with pad-shaped nose pad members 108a. The protectors 108 are long and slender plate members which are curved in two-stage crank shape, and are integral parts which are formed of a metallic material or a resin material.

The image forming devices 9A and 10A include an image display device 11A, a panel case 90, an optical projection system 12A, a lens barrel 511, and an exterior case 14.

Although details will be described later, the image display device 11A is an example of a "display unit", is stored within the panel case 90, and outputs (emits) image light to the side of the optical projection system 12A.

The optical projection system 12A is maintained by a lens barrel 511. The optical projection system 12A is a collimate lens which converts the image light, which is output from the image display device 11A, into light flux in a parallel state.

The exterior case 14 is a member (housing) which contains the panel case 90 (image display device 11A) and a lens barrel 511 (optical projection system 12A). The exterior case 14 is formed of a material which does not conduct heat easily. The exterior case 14 is formed of, for example, a resin material such as polyolefin, fluororesin, acryl, vinyl chloride, polyester, polystyrene, or an ABS resin.

The exterior case 14 is arranged to cover a part of the crain section 121B, and is maintained in the crain section 121B. The exterior case 14 is formed in such a way that an inner surface side part 14A is fitted to an outer surface side part 14B. The inner surface side part 14A is arranged on the side of the wearer M, and includes a surface 14-1A which comes into contact with the wearer M.

Meanwhile, the surface 14-1A is an example of a "contact surface which comes into contact with the human body".

According to the configuration, image light, which is emitted from the image forming device 9A and 10A, is guided through the first optical panel 111A and the second optical panel 112A, and is incident to the eyes of the wearer M. Further, outside light passes through the first optical panel 111A and the second optical panel 112A, and is incident to the eyes of the wearer M. As a result, the wearer M can superimposedly recognize the virtual image generated by the image light and the external world image (actual image) generated by the outside light.

As shown in FIG. 13, the image display device 11A includes the organic EL display device 30 and a flexible substrate (hereinafter, refer to "FPC") 75.

The lens barrel 511 includes a pair of lower projection 511a and an upper projection 511b. The lens barrel 511 is formed of, for example, a resin molded component (a resin material which has a heat conduction property) which has a thermally-conductive filler. That is, the lens barrel 511 is formed of a material, which conducts heat easily, and has a heat conduction property as a whole.

The lens barrel 511 includes an attachment section 521 in the Z direction. The lens barrel 511 is fixed to the crain section 121B through the attachment section 521. In addition, a heat conductive adhesive 83 is arranged between the attachment section 521 and the crain section 121B. Accordingly, heat is favorably transferred (propagated) from the lens barrel 511 to the crain section 121B and the frame 121A (housing 121).

The panel case 90 is formed of a resin molded component (a resin material which has a heat conduction property) which has a thermally-conductive filler similarly to the lens barrel 511. That is, the panel case 90 is formed of a material which conducts heat easily, and has a heat conduction property as a whole.

The panel case 90 includes a lower recess 90a corresponding to the lower projection 511a of the lens barrel 511, an upper recess 90b corresponding to the upper projection 511b of the lens barrel 511, and a recess 95 which contains the organic EL display device 30.

The organic EL display device 30 is bonded to (contained in) the recess 95 of the panel case 90 through the heat conductive adhesive 83. One end of the FPC 75 is connected to the organic EL display device 30. The other end of the FPC 75 is derived to the outside of the panel case 90 (Y(+) direction), and is connected to a power source section (not shown in the drawing).

The heat conductive adhesive 83 includes, for example, a thermally-conductive filler such as silicon oxide or aluminum oxide.

Meanwhile, connection between the lens barrel 511 and the crain section 121B and connection between the panel case 90 and the organic EL display device 30 may be performed using a heat radiation sheet or a heat radiation grease in addition to the heat conductive adhesive 83.

The panel case 90 and the lens barrel 511 which maintain the organic EL display device 30 are integrated in such a way that the lower recess 90a is fitted to the lower projection 511a and the upper recess 90b is fitted to the upper projection 511b, respectively. A heat conductive adhesive (not shown in the drawing) fixes between the panel case 90 and the lens barrel 511 (a gap of a fitting part). Therefore, heat of the organic EL display device 30 is favorably transferred (propagated) to the crain section 121B and the frame 121A through the panel case 90 and the lens barrel 511.

Meanwhile, the panel case 90 and the lens barrel 511 may be formed of a light material which conducts heat easily, and may be formed of, for example, a light metal material, such as aluminum, aluminum alloy, magnesium, or magnesium alloy, in addition to the resin material which has the above-described heat conduction property.

Overview of Image Display Device

Figure 14:
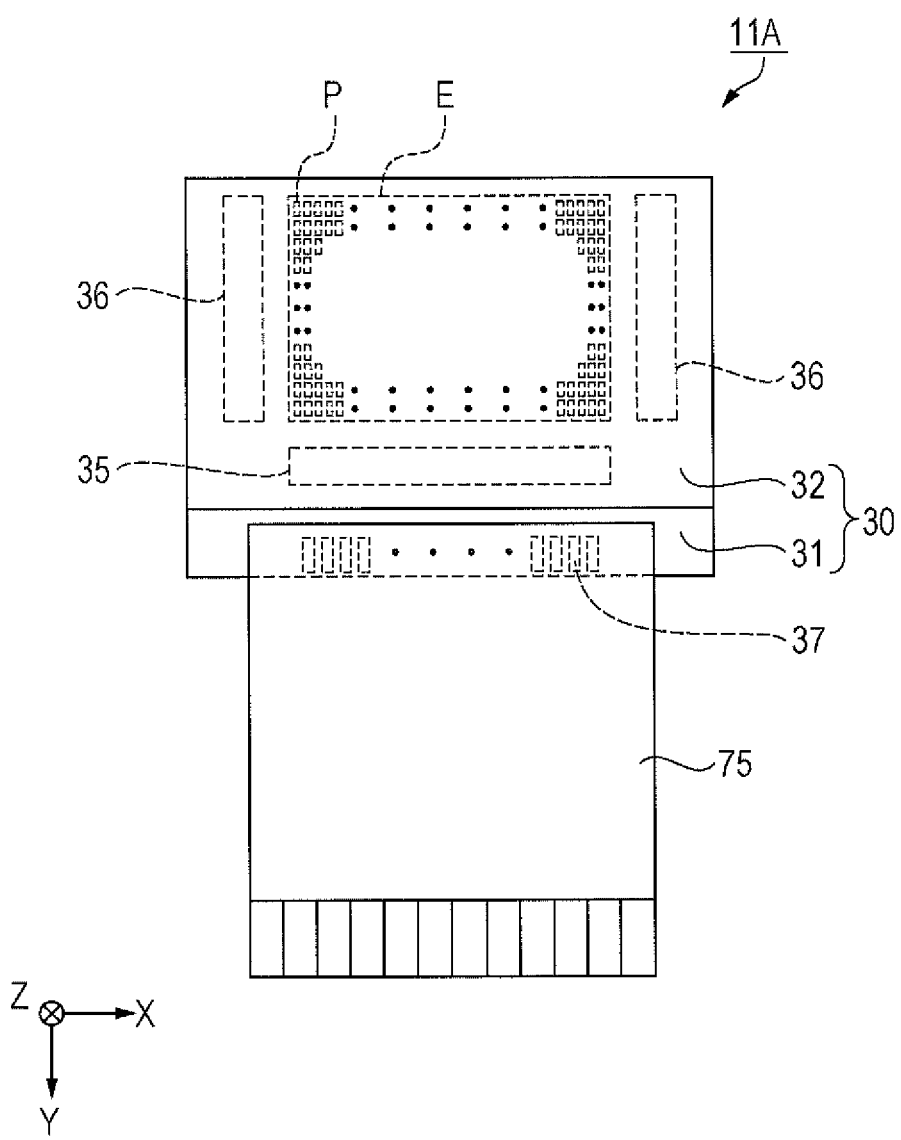
FIG. 14 is a schematic plan diagram illustrating an image display device.

FIG. 14 is a schematic plan diagram illustrating the image display device. In FIG. 14, only components which are necessary for the description are shown in the drawing and components which are not necessary for the description are not shown in the drawing.

Subsequently, the overview of the image display device 11A will be described with reference to FIG. 14.

As shown in FIG. 14, the image display device 11A includes the organic EL display device 30 and the FPC 75. The FPC 75 is connected to the external connection terminals 37 which are provided at the end of the organic EL display device 30.

The organic EL display device 30 includes the element substrate 31 and the sealing substrate 32, and both the substrates are bonded by a resin layer (not shown in the drawing). The organic EL display device 30 has the same configuration as the organic EL display device 30 according to the first embodiment, and the detailed description thereof will not be repeated.

As described above, in the organic EL display device 30, the data line drive circuit 35 (refer to FIG. 5) and the organic EL elements 45 (refer to FIG. 6) generate heat. Heat, which is generated by the data line drive circuit 35 and the organic EL elements 45, is favorably transferred (propagated) to the crain section 121B and the frame 121A through the base material (silicon substrate) of the element substrate 31 which has an excellent heat conduction property, the panel case 90, and the lens barrel 511.

When the crain section 121B and the frame 121A are used as the heat radiation sections, it is possible to reduce the influence of heat which is generated by the data line drive circuit 35 and the organic EL elements 45. That is, it is possible to suppress the temperature rise of the organic EL elements 45, to suppress the deterioration of the organic EL elements 45, and to improve the reliability of the organic EL display device 30 (the virtual image display device 101).

Heat, which is generated by the data line drive circuit 35 and the organic EL elements 45, is also transferred (propagated) to the wearer M through the base material (silicon substrate) of the element substrate 31 which has an excellent heat conduction property, the panel case 90, and the exterior case 14, and thus there is a problem in that the wearer M may feel uncomfortable due to heat. As described above, the exterior case 14 is formed of a material which does not conduct heat easily. That is, the thermal conductivity of the exterior case 14 is lower than the thermal conductivity of the panel case 90, and the exterior case 14 does not conduct heat easily compared to the panel case 90. Therefore, hat, which is generated by the data line drive circuit 35 and the organic EL elements 45 is not transferred (propagated) easily to the wearer M compared to the crain section 121B and the frame 121A.

Further, in the embodiment, an excellent configuration (feature) is provided in which heat, which is generated by the data line drive circuit 35 and the organic EL elements 45, is not transferred (propagated) easily to the wearer M. According to the configuration (feature), it is possible to suppress the influence of heat with regard to the wearer M like the wearer M feels uncomfortable due to heat.

Hereinafter, the feature of the embodiment that is, heat, which is generated by the data line drive circuit 35 and the organic EL elements 45 is not transferred (propagated) easily to the wearer M, will be described.

Feature of Embodiment

Figure 15:
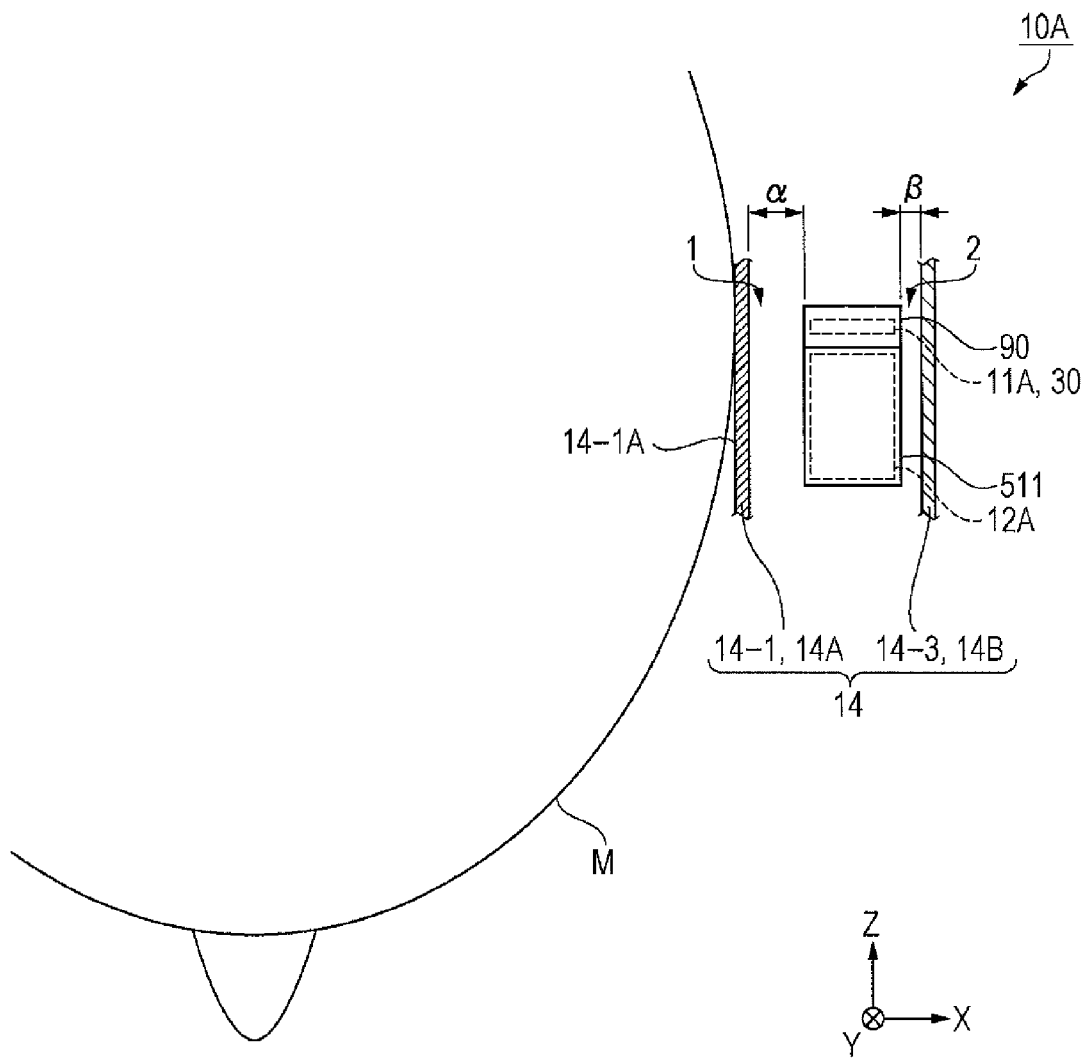
FIG. 15 is a schematic diagram illustrating a state on a side in which the first image forming device of the virtual image display device according to the fourth embodiment is provided.

FIG. 15 is a schematic diagram illustrating a state on a side in which the first image forming device is provided. FIG. 15 is a schematic diagram illustrating the wearer M who wears the virtual image display device 101 when viewed from the Y(-) direction, and illustrating the relationship between the exterior case 14 and the panel case 90.

As described above, since the second image forming device 9A has the same structure (configuration) as the first image forming device 10A, description on the side in which the second image forming device 9A is provided will not be repeated, and the feature of the embodiment will be described on the side in which the first image forming device 10A is provided.

As shown in FIG. 15, the exterior case 14 includes a wall 14-1 and a wall 14-3 which are sequentially arranged along the X direction. The wall 14-1 includes a surface 14-1A which comes into contact with the wearer M. The wall 14-1 is the component of the inner surface side part 14A of the exterior case 14 and the wall 14-3 is the component of the outer surface side part 14B of the exterior case 14.

Meanwhile, the wall 14-1 is an example of a "first wall". The wall 14-3 is an example of a "second wall" in Application Examples 10 to 14. Further, in the description below, a surface 14-1A is called a contact surface 14-1A.

The panel case 90 is arranged between the wall 14-1 and the wall 14-3. The panel case 90 is arranged to be separated from the wall 14-1, and a first space 1 is formed between the wall 14-1 and the panel case 90. The panel case 90 is arranged to be separated from the wall 14-3, and a second space 2 is formed between the wall 14-3 and the panel case 90.

That is, a single space (first space 1) is arranged between the contact surface 14-1A and the panel case 90.

The first space 1 and the second space 2 are filled with atmospheric pressure air. In other words, a space between the wall 14-1 and the panel case 90 and a space between the wall 14-3 and the panel case 90 are filled with atmospheric pressure air.

As described above, heat, which is generated by the data line drive circuit 35 and the organic EL elements 45, is transferred (propagated) to the panel case 90. It is important to cause heat, which is transferred (propagated) to the panel case 90, to be not conducted easily to the wall 14-1 and the contact surface 14-1A. That is, it is important to reduce heat conduction from a high temperature section (panel case 90) to a low temperature section (the wall 14-1 and the contact surface 14-1A).

The transfer of heat from the high temperature section (panel case 90) to the low temperature section (the wall 14-1 and the contact surface 14-1A) is generated by heat conduction due to a medium, heat conduction due to the circulation (convection) of the media, and heat conduction due to radiation. Accordingly, in order to reduce the transfer of heat from the high temperature section (panel case 90) to the low temperature section (the wall 14-1 and the contact surface 14-1A), it is important to reduce heat conduction due to the media, heat conduction due to the circulation (convection) of the media, and heat conduction due to radiation.

In the embodiment, a medium which generates heat conduction includes atmospheric pressure air. The thermal conductivity of atmospheric pressure air is 0.026 W/mK at room temperature. The thermal conductivity of a resin which forms the wall 14-1 and the wall 14-3 is approximately in a range of 0.2 W/mK to 0.3 W/mK at room temperature. The thermal conductivity of atmospheric pressure air is extremely low compared to the thermal conductivity of the resin. That is, when a space (first space 1) is provided between the panel case 90 and the wall 14-1 and the space is filled with atmospheric pressure air (media which has low thermal conductivity), heat conduction due to the media is extremely low, and thus it is possible to reduce the transfer of heat from high temperature section (panel case 90) to the low temperature section (the wall 14-1 and the contact surface 14-1A).

Meanwhile, the heat of the panel case 90 is transferred (propagated) to the wall 14-3 (outer surface side part 14B), and is transferred (propagated) to the inner surface side part 14A (the wall 14-1 and the contact surface 14-1A) through the outer surface side part 14B (wall 14-3). Since the second space 2 is provided between the panel case 90 and the wall 14-3 and the second space 2 is filled with atmospheric pressure air (media which has low thermal conductivity), heat of the panel case 90 is not conducted easily to the wall 14-3. Accordingly, heat of the panel case 90 is not transferred (propagated) easily to the inner surface side part 14A (the wall 14-1 and the contact surface 14-1A) through the outer surface side part 14B (wall 14-3).

The distance $\alpha$ between the wall 14-1 and the panel case 90 is greater than the distance $\beta$ between the wall 14-3 and the panel case 90. In other words, the dimension $\alpha$ of the first space 1 in the x direction is greater than the dimension $\beta$ of the second space 2 in the X direction. Further, the distance $\alpha$ between the wall 14-1 and the panel case 90 is equal to or less than 12 mm.

When the distance $\alpha$ between the wall 14-1 and the panel case 90 is greater than 12 mm, convection (circulation) of atmospheric pressure air, with which the first space 1 is filled, occurs, and thus heat of the panel case 90 is transferred (propagated) easily to the wall 14-1 and the contact surface 14-1A due to the air convection (circulation).

In the embodiment, since the distance $\alpha$ between the wall 14-1 and the panel case 90 is equal to or less than 12 mm and the convection (circulation) of atmospheric pressure air does not easily occur, heat conduction due to the circulation (convection) of the media is reduced, and thus it is possible to reduce the transfer of heat from the high temperature section (panel case 90) to the low temperature section (the wall 14-1 and the contact surface 14-1A).

Therefore, it is preferable that the distance $\alpha$ between the wall 14-1 and the panel case 90 be equal to or less than 12 mm.

The heat conduction due to radiation is inversely proportional to the square of the distance between the high temperature section (panel case 90) and the low temperature section (the wall 14-1 and the contact surface 14-1A). That is, if the distance between the high temperature section and the low temperature section becomes large, the influence of heat conduction due to radiation is reduced. If the distance between the high temperature section and the low temperature section is reduced, the influence of heat conduction due to radiation becomes large. In the embodiment, the distance $\alpha$ between the wall 14-1 and the panel case 90 is greater than the distance $\beta$ between the wall 14-3 and the panel case 90, and thus it is possible to reduce the influence of heat conduction due to radiation compared to a case in which the distance $\alpha$ is less than the distance $\beta$.

Meanwhile, the transfer of heat from the high temperature section (panel case 90) to the low temperature section (the wall 14-1 and the contact surface 14-1A) is affected most by heat conduction due to the medium. Therefore, it is most important to provide the space (first space 1) between the high temperature section (panel case 90) and the low temperature section (the wall 14-1 and the contact surface 14-1A), to fill the space with the media which has low thermal conductivity (atmospheric pressure air), and to reduce the influence of heat conduction due to the media. That is, if the space is provided between the high temperature section (panel case 90) and the low temperature section (the wall 14-1 and the contact surface 14-1A) in order to suppress the transfer of heat from the high temperature section (panel case 90) to the low temperature section (the wall 14-1 and the contact surface 14-1A), it is possible to obtain remarkable effect (insulation effect).

As described above, in the embodiment, it is possible to further reduce heat conduction from the high temperature section (panel case 90) to the low temperature section (the wall 14-1 and the contact surface 14-1A) and further suppress the influence of heat with regard to the human body according to the feature which is described below. That is, when the electro-optical apparatus is used after being worn on the head, it is possible to suppress discomfort due to the temperature rise, and thus it is possible to secure comfort without impairing a fit feeling. Meanwhile, individual difference exists in the fit feeling, and there is a person who does not feel discomfort even when temperature rises while the person is wearing the electro-optical apparatus. However, a problem is recognized from a point of view in which it is further preferable that temperature be less transferred to the temples, in other words, less temperature change when the electro-optical apparatus is being used.

1) When the space (first space 1) is provided between the high temperature section (panel case 90) and the low temperature section (the wall 14-1 and the contact surface 14-1A) and the space is filled with a material (atmospheric pressure air) which has low thermal conductivity, it is possible to reduce heat conduction due to the medium with regard to the wall 14-1 and the contact surface 14-1A.

2) When the distance α between the wall 14-1 and the panel case 90 is equal to or less than 12 mm and the convection of air, with which the first space 1 is filled, does not occur easily, it is possible to reduce heat conduction due to the circulation (convection) of the medium with regard to the wall 14-1 and the contact surface 14-1A.

3) When the distance α between the wall 14-1 and the panel case 90 is caused to be greater than the distance β between the wall 14-3 and the panel case 90, it is possible to reduce heat conduction due to radiation with regard to the wall 14-1 and the contact surface 14-1A.

4) When heat conduction due to the medium, heat conduction due to the circulation (convection) of the medium, and heat conduction due to radiation are caused to be reduced, it is possible to reduce the transfer of heat from the high temperature section (panel case 90) to the low temperature section (the wall 14-1 and the contact surface 14-1A) and to suppress the temperature rise of the contact surface 14-1A.

Fifth Embodiment

Overview of Virtual Image Display Device

Figure 16:
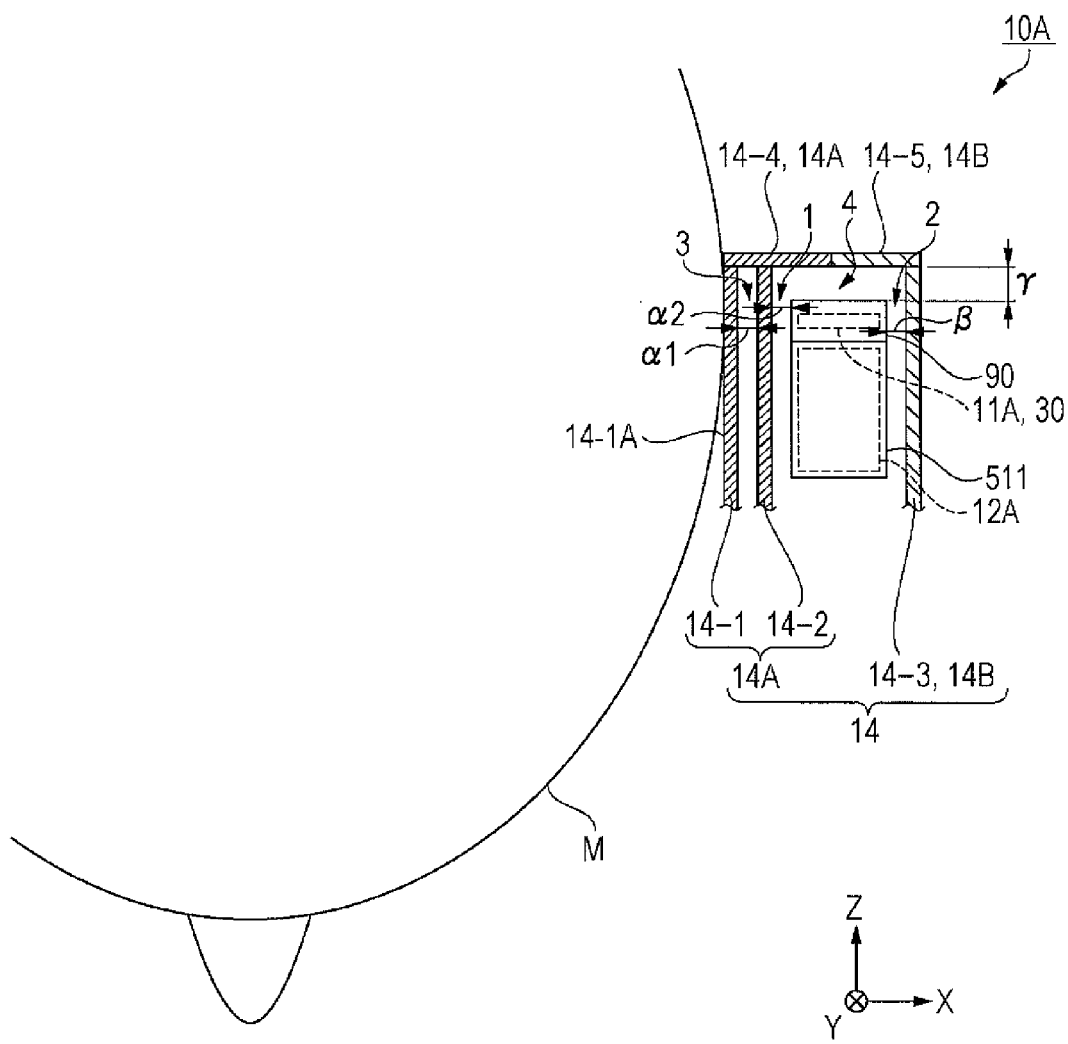
FIG. 16 is a schematic diagram illustrating a state on a side in which the first image forming device of a virtual image display device according to a fifth embodiment is provided.

FIG. 16 is a diagram corresponding to FIG. 15, and is a schematic diagram illustrating a state of a side in which the first image forming device of the virtual image display device according to a fifth embodiment is provided. In addition, FIG. 16 illustrates a state of the end of the exterior case 14 on the side of the Z direction.

In the virtual image display device according to the embodiment, a first image forming device 10A includes a wall 14-2 between a wall 14-1 and a panel case 90. This point is the different point between the virtual image display device according to the embodiment and the virtual image display device 101 according to the fourth embodiment. The other configurations are the same between the virtual image display device according to the embodiment and the virtual image display device 101 according to the fourth embodiment.

Hereinafter, the different point between the virtual image display device according to the embodiment and the virtual image display device 101 according to the fourth embodiment will be mainly described with reference to FIG. 16. In addition, the same reference numerals are attached to the same components as in the fourth embodiment, and the description thereof will not be repeated.

As shown in FIG. 16, the exterior case 14 includes the wall 14-1, a wall 14-2, and a wall 14-3 which are sequentially arranged from a part which comes into contact with the wearer M along the X direction. A wall 14-4 is arranged at the ends of the wall 14-1 and the wall 14-2 on the side of the Z direction. A wall 14-5 is arranged at the end of the wall 14-3 on the side of the Z direction.

Meanwhile, the wall 14-1 is an example of a "first wall", the wall 14-2 is an example of a "third wall" in Application Examples 10 to 14, and the wall 14-3 is an example of a "second wall" in Application Examples 10 to 14.

The wall 14-1, the wall 14-2, and the wall 14-4 are the components of the inner surface side part 14A of the exterior case 14. The wall 14-3 and the wall 14-5 are the components of the outer surface side part 14B of the exterior case 14.

The panel case 90 is arranged between the wall 14-2 and the wall 14-3. The panel case 90 is arranged to be separated from the wall 14-2, and a first space 1 is formed between the wall 14-2 and the panel case 90. The panel case 90 is arranged to be separated from the wall 14-3, and a second space 2 is formed between the wall 14-3 and the panel case 90. Further, a third space 3 is formed between the wall 14-1 and the wall 14-2.

That is, two spaces (the first space 1 and the third space 3) are arranged between a contact surface 14-1A and the panel case 90.

The wall 14-4 and the wall 14-5 are arranged along the X direction, and a surface which faces the panel case 90 along the X direction is formed by the wall 14-4 and the wall 14-5. A fourth space 4 is formed between the wall 14-4 and the wall 14-5, and the panel case 90.

The sum of the distance α1 between the wall 14-1 and the wall 14-2 and the distance α2 between the wall 14-2 and the panel case 90 is greater than the distance β between the wall 14-3 and the panel case 90. In other words, the sum of the dimension α1 of the third space 3 in the X direction and the dimension α2 of the first space 1 in the X direction is greater than the dimension β of the second space 2 in the X direction.

Further, the distance γ between the walls 14-4 and 14-5 and the panel case 90 is greater than the distance β between the wall 14-3 and the panel case 90. In other words, the dimension γ of the fourth space 4 in the Z direction is greater than the dimension β of the second space 2 in the X direction.

In the embodiment, two spaces, that is, the first space 1 and the third space 3 are arranged between the contact surface 14-1A and the panel case 90.

An image display device 11A is arranged in the first space 1, the second space 2, and the fourth space 4. At a part in which the image display device 11A is arranged, it is difficult to improve the airtightness of the spaces (the first space 1, the second space 2, and the fourth space 4), in which the image display device 11A is arranged, by a section, in which the inner surface side part 14A is engaged with the outer surface side part 14B, and a section which derives the FPC 75.

Therefore, the first space 1, the second space 2, and the fourth space 4 are filled with atmospheric pressure air. In other words, the space between the wall 14-2 and the panel case 90, the space between the wall 14-3 and the panel case 90, and the space between the walls 14-4 and 14-5 and the panel case 90 are filled with atmospheric pressure air.

The third space 3 is a space which is surrounded by the wall 14-1, the wall 14-2, the wall 14-4, and the like, and the image display device 11A is not arranged in the third space 3. Since the third space 3 is not provided with the engagement section, the section which derives the FPC 75, and the like, it is possible to improve the airtightness of the third space 3. As a result, the third space 3 is filled with depressurized air.

The thermal conductivity of depressurized air is lower than the thermal conductivity of atmospheric pressure air. Therefore, when the space (third space 3), which is provided between the high temperature section (panel case 90) and the low temperature section (the wall 14-1 and the contact surface 14-1A), is filled with depressurized air, it is possible to further reduce the heat conduction due to the medium compared to the fourth embodiment and it is possible to further reduce the transfer of heat from the high temperature section (panel case 90) to the low temperature section (the wall 14-1 and the contact surface 14-1A).

Since the sum of the distance α1 between the wall 14-1 and the wall 14-2 and the distance α2 between the wall 14-2 and the panel case 90 is greater than the distance β between the wall 14-3 and the panel case 90, it is possible to reduce heat conduction due to the radiation compared to a case in which the sum of the distance α1 and the distance a2 is smaller than the distance β.

For example, heat of the panel case 90 is transferred (propagated) to the wall 14-1 and the contact surface 14-1A through the wall 14-4 and the wall 14-5. Since the fourth space 4 is provided between the panel case 90 and the walls 14-4 and 14-5, heat of the panel case 90 is not transferred (propagated) easily to the wall 14-4 and the wall 14-5.

Further, since the distance γ between the panel case 90 and the walls 14-4 and 14-5 is greater than the distance β between the panel case 90 and the wall 14-3, the influence of heat conduction due to radiation is reduced and heat of the panel case 90 is not conducted easily to the wall 14-4 and the wall 14-5, compared to a case in which the distance γ is less than the distance β.

As described above, in the embodiment, the space (third space 3), which is filled with depressurized air, is provided between the high temperature section (panel case 90) and the low temperature section (the wall 14-1 and the contact surface 14-1A). Therefore, it is possible to further reduce the transfer of heat from the high temperature section (panel case 90) to the low temperature section (the wall 14-1 and the contact surface 14-1A) and to suppress the influence of heat with regard to the human body, compared to the fourth embodiment.

The present application is not limited to the embodiments and can be appropriately modified without departing from the gist or spirit of the invention which is read from the claims and the whole specification. An electro-optical apparatus accompanying such modification and an electronic apparatus on which the electro-optical apparatus is mounted are included in the technical scope of the present application. In addition to the embodiment, various modification examples are conceivable. Hereinafter, modification examples will be described.

SIXTH MODIFICATION EXAMPLE

Figure 17:
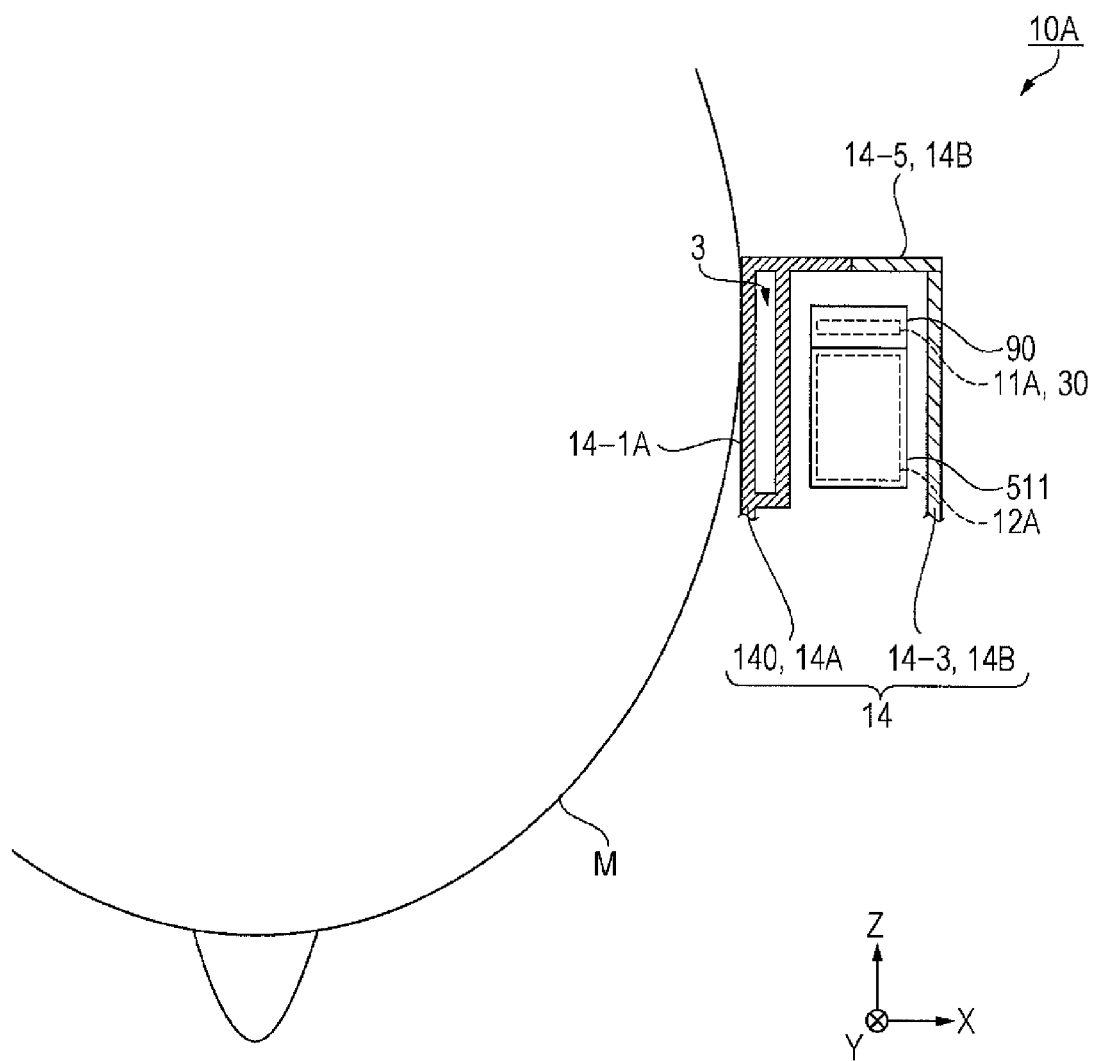
FIG. 17 is a schematic diagram illustrating a state on a side in which the first image forming device of a virtual image display device according to a sixth modification example is provided.

FIG. 17 is a diagram corresponding to FIG. 16, and is a schematic diagram illustrating a state of a side in which the first image forming device of a virtual image display device according to a sixth modification example is provided.

As shown in FIG. 17, the third space 3 is formed in a member 140 acquired by integrating the wall 14-1, the wall 14-2, and the wall 14-4 according to the fifth embodiment. Meanwhile, the member 140 is the component of the inner surface side part 14A.

When the third space 3 is formed in the integrated member 140, it is possible to improve the airtightness of the third space 3. That is, when the airtightness of the member 140 which forms the third space 3 is improved, it is possible to suppress the change in pressure of depressurized air, with which the third space 3 is filled, and to maintain the excellent thermal insulation property of the third space 3.

SEVENTH MODIFICATION EXAMPLE

Figure 18:
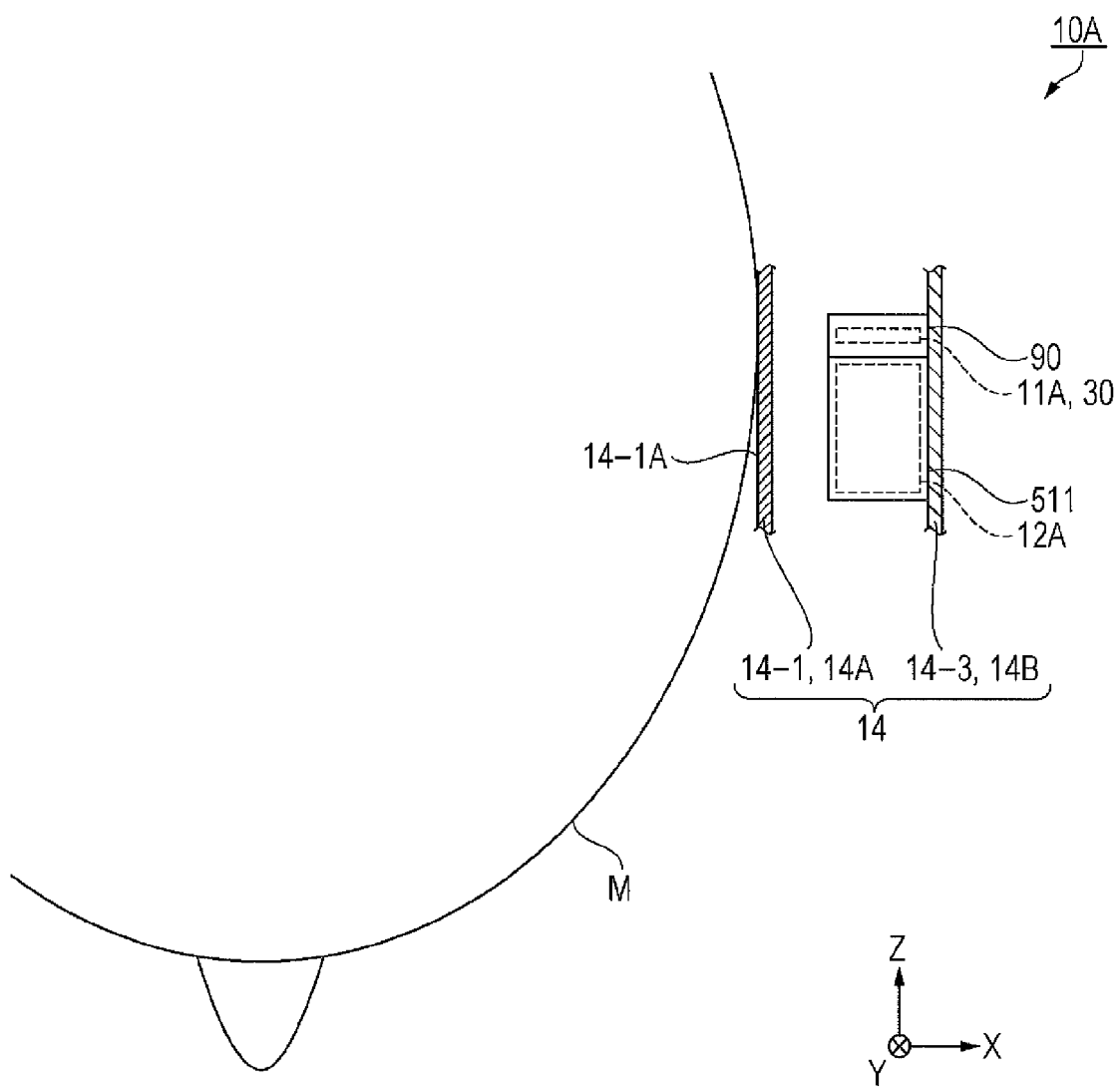
FIG. 18 is a schematic diagram illustrating a state on a side in which the first image forming device of a virtual image display device according to a seventh modification example is provided.
Figure 19:
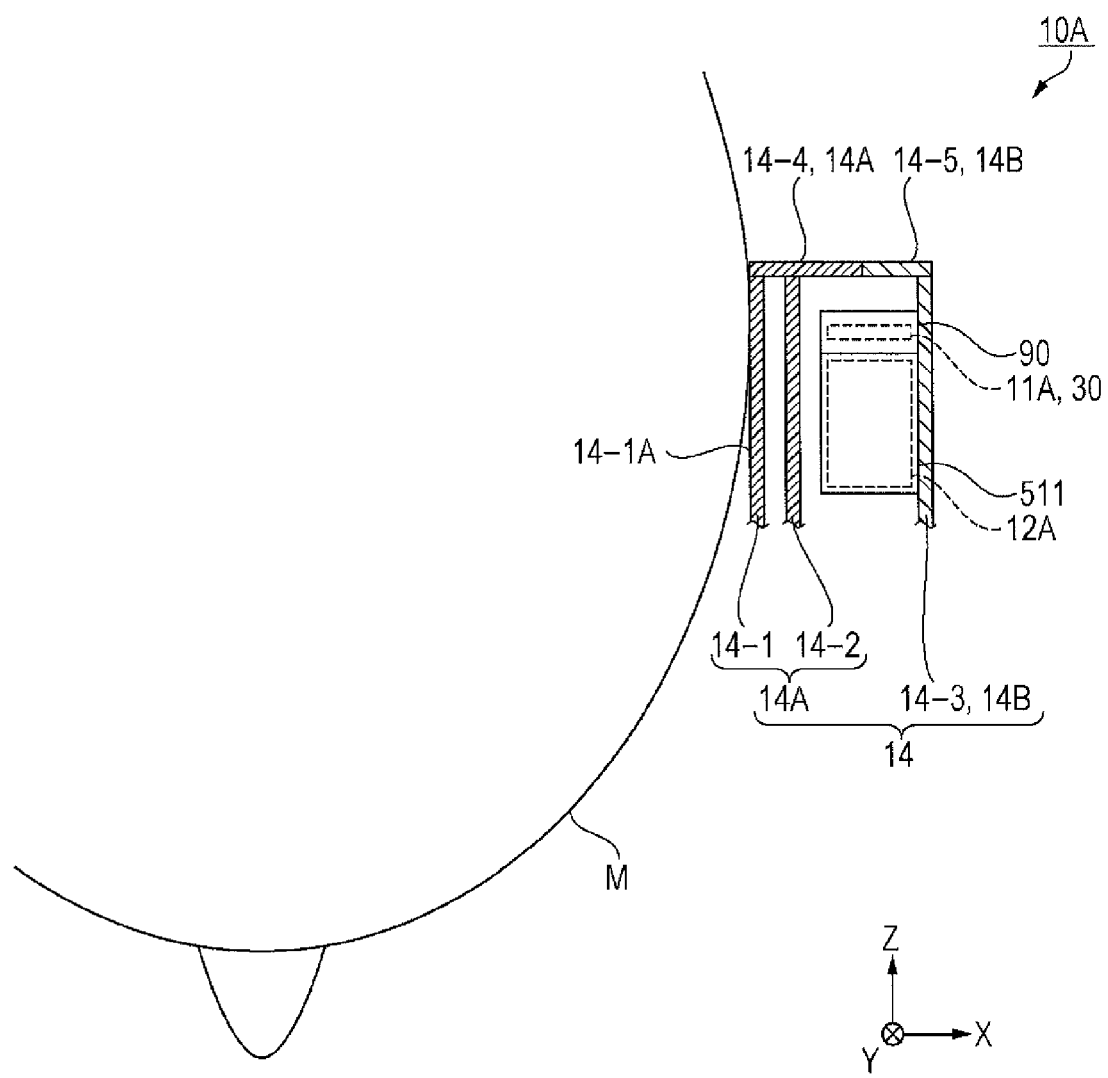
FIG. 19 is a schematic diagram illustrating a state on a side in which the first image forming device of a virtual image display device according to the seventh modification example is provided.

FIG. 18 is a diagram corresponding to FIG. 15. FIG. 19 is a diagram corresponding to FIG. 16. That is, FIGS. 18 and 19 are schematic diagrams illustrating a state of a side in which the first image forming device of a virtual image display device according to a seventh modification example is provided.

As shown in FIG. 18, the wall 14-3 comes into contact with the panel case 90. As shown in FIG. 19, the wall 14-3 comes into contact with the panel case 90. That is, the distance β between the wall 14-3 and the panel case 90 (refer to FIGS. 15 and 16) may be 0 mm.

For example, in FIG. 19, heat of the panel case 90 is transferred (propagated) to the wall 14-1 and the contact surface 14-1A according to heat conduction through the wall 14-3, the wall 14-5, and the wall 14-4. Further, the wall 14-3, the wall 14-5, and the wall 14-4 are formed of a material which does not transmit heat easily. That is, a medium (the wall 14-4 and the wall 14-5), which is formed of the material which does not transmit heat easily, is arranged between the wall 14-3 and the wall 14-1 and a path (dimension) of the media which transmits heat becomes long. Therefore, even when the wall 14-3 comes into contact with the panel case 90, heat of the panel case 90 is not transferred (propagated) easily to the wall 14-1 and the contact surface 14-1A due to the heat conduction of the wall 14-5 and the wall 14-4.

Therefore, it is preferable that the distance β between the wall 14-3 and the panel case 90 be equal to or greater than 0 mm. Further, when the distance β between the wall 14-3 and the panel case 90 is 0 mm, the dimension of the exterior case 14 in the X direction is reduced compared to a case in which the distance 3 between the wall 14-3 and the panel case 90 is greater than 0 mm, and thus it is possible to cause the exterior case 14 to be thin.

Further, when a material which conducts heat easily is used as the material which forms the wall 14-3 similarly to the panel case 90, it is possible to use the wall 14-3 as the heat radiation section.

EIGHTH MODIFICATION EXAMPLE

In the fourth embodiment, a single space (first space 1) is arranged between the contact surface 14-1A and the panel case 90 (refer to FIG. 15). In the fifth embodiment, two spaces (the first space 1 and the third space 3) are arranged between the contact surface 14-1A and the panel case 90 (refer to FIG. 16). The number of spaces which are arranged between the contact surface 14-1A and the panel case 90 may be greater than two. That is, at least one space may be arranged between the contact surface 14-1A and the panel case 90.

NINTH MODIFICATION EXAMPLE

In the space in which the image display device 11A is arranged, it is difficult to improve airtightness due to the section, in which the inner surface side part 14A is engaged with the outer surface side part 14B, and the section which derives the FPC 75. Therefore, the space is filled with atmospheric pressure air. That is, in the fourth embodiment, the space (the first space 1 and the second space 2), in which the image display device 11A is arranged, is filled with atmospheric pressure air. In the fifth embodiment, the space (the first space 1, the second space 2, and the fourth space 4), in which the image display device 11A is arranged, is filled with atmospheric pressure air.

The section, in which the inner surface side part 14A is engaged with the outer surface side part 143, the section which derives the FPC 75, and the like may be sealed airtight by, for example, a sealing material or the like, and the space in which the image display device 11A is arranged may be filled with depressurized air.

Further, the third space 3 according to the fifth embodiment may be filled with atmospheric pressure air.

That is, in the fourth embodiment, the first space 1 and the second space 2 may be filled with atmospheric pressure air or depressurized air. In the fifth embodiment, the first space 1, the second space 2, the third space 3, and the fourth space 4 may be filled with atmospheric pressure air or depressurized air.

TENTH MODIFICATION EXAMPLE

As described above, in the image forming device 9A or 10A, the temperature rise of the contact surface 14-1A is suppressed. Therefore, in an electronic apparatus to which the image forming device 9A or 10A is applied, the temperature rise of the contact surface 14-1A is suppressed, and thus, it is possible to suppress discomfort due to, for example, temperature rise.

Further, the electronic apparatus to which the image forming device 9A or 10A is applied is not limited to the virtual image display device 101 (head-mounted display device). For example, it is possible to apply the image forming device 9A or 10A to the display unit of an electronic apparatus, such as a wearable computer, a wearable phone, or a wearable watch, which is attachable to and detachable from the human body.

ELEVENTH MODIFICATION EXAMPLE

Description will be made with reference to FIG. 12.

In the embodiments and the modification examples, description is made such that the inner surface side part 14A on the side of the human body (wearing person) comes into contact with the temples. However, the invention is not limited to the configuration, and the inner surface side part 14A may be separated from the temples. In other words, a gap may be formed between the wall 13-1, which is positioned on the side of the wearing person, and the temples. For example, in FIG. 12, the first image forming device 10 which has the box shape is projected out over the inside of the housing 121. However, the first image forming device 10 may be projected out over the outside of the housing 121. The configuration is the same as in the second image forming device 9.

Even in the configuration, the virtual image display device 101 is mounted on the head using the nose pad member 108a, which is hung on the nose of the wearing person, and the crain sections 121B, which are hung on ears, similarly to glasses, and thus there is no problem of wearability. Further, a gap is formed between the image forming device 9A or 10A, which is a heat generation section, and the temples, and the gap functions as an insulation space (insulation section), and thus it is possible to reduce the heat propagation to the temples.

The entire disclosure of Japanese Patent Application No.: 2013-265004, filed Dec. 24, 2013, 2014-176880, filed Sep. 1, 2014, 2014-210518, filed Oct. 15, 2014, and 2014-210524, filed Oct. 15, 2014 are expressly incorporated by herein.

What is claimed is:

1. An electro-optical apparatus which is wearable on a human body, the apparatus comprising:
    a display unit that includes pixels and a drive circuit which drives the pixels;
    a lens that converts image light output from the display unit into light flux; and
    a case that contains the display unit and the lens, and includes a contact surface which comes into contact with the human body, the case including a plurality of walls,
    the contact surface being a first wall of the plurality of walls and being arranged to be separated from the display unit by a second wall of the plurality of walls and at least one space,
    the at least one space including a first space that is bounded on four sides by the first wall and the second wall, and
    the second wall being disposed between the first wall and the lens.

2. The electro-optical apparatus according to claim 1, wherein the first space is filled with atmospheric pressure air or depressurized air.

3. An electronic apparatus comprising the electro-optical apparatus according to claim 2.

4. The electro-optical apparatus according to claim 1, wherein the at least one space further includes a second space, and the contact surface is arranged to be further separated from the display unit by the second space.

5. An electronic apparatus comprising the electro-optical apparatus according to claim 4.

6. The electro-optical apparatus according to claim 1, wherein organic electroluminescence elements are formed in the pixels.

7. An electronic apparatus comprising the electro-optical apparatus according to claim 6.

8. An electronic apparatus comprising the electro-optical apparatus according to claim 1.

9. An electro-optical apparatus which is wearable on a human body, the apparatus comprising:
    a display unit that includes pixels and a drive circuit which drives the pixels;
    a panel case that contains the display unit;
    a lens that converts image light output from the display unit into light flux; and
    a case that contains the panel case and the lens,
    wherein the case includes a first wall, a second wall and a third wall,
    the first wall including a contact surface which comes into contact with the human body,
    the panel case being arranged between the first wall and the third wall,
    the second wall being disposed between the first wall and the lens,
    a first space being formed between the second wall and the panel case, a second space being formed between the panel case and the third wall, and a third space being formed between the first wall and the second wall,
    the third space being bounded on four sides by at least the first wall and the second wall, and a sum of a width of the first space and a width of the third space being greater than a width of the second space.

10. The electro-optical apparatus according to claim 9, wherein the first space and the second space are filled with atmospheric pressure air or depressurized air.

11. An electronic apparatus comprising the electro-optical apparatus according to claim 10.

12. The electro-optical apparatus according to claim 9, wherein the width of the first space is equal to or less than 12 mm, and
wherein the width of the second space is equal to or greater than 0 mm.

13. An electronic apparatus comprising the electro-optical apparatus according to claim 12.

14. The electro-optical apparatus according to claim 9, wherein a thermal conductivity of the case is less than a thermal conductivity of the panel case.

15. An electronic apparatus comprising the electro-optical apparatus according to claim 14.

16. An electronic apparatus comprising the electro-optical apparatus according to claim 9.

17. An electro-optical apparatus which is wearable on a human body, the apparatus comprising:
a display unit that includes pixels and a drive circuit which drives the pixels;
a lens that converts image light output from the display unit into light flux; and
a case that contains the display unit and the lens, and includes a first wall which is positioned on a side of the human body,
the first wall being arranged to be separated from the display unit by a second wall and at least one space,
the at least one space including a first space that is bounded on four sides by the first wall and the second wall,
the second wall being disposed between the first wall and the lens.

18. An electronic apparatus comprising the electro-optical apparatus according to claim 17.

19. An electro-optical apparatus which is wearable on a human body, the apparatus comprising:
a display unit that includes pixels and a drive circuit which drives the pixels;
a panel case that contains the display unit;
a lens that converts image light output from the display unit into light flux; and
a case that contains the panel case and the lens,
the case including a first wall, a second wall and a third wall,
the first wall being positioned on a side of the human body,
the panel case being arranged between the first wall and the third wall,
the second wall being disposed between the first wall and the lens,
a first space being formed between the second wall and the panel case, a second space being formed between the panel case and the third wall, and a third space being formed between the first wall and the second wall,
the third space being bounded on four sides by at least the first wall and the second wall, and
a sum of a width of the first space and a width of the third space being greater than a width of the second space.

20. An electronic apparatus comprising the electro-optical apparatus according to claim 19.

* * * * *